US012567573B2

(12) United States Patent
Remes et al.

(10) Patent No.: US 12,567,573 B2

(45) Date of Patent: Mar. 3, 2026

(54) DATA INDEPENDENT ACQUISITION WITH PARALLEL ISOLATION MULTIPLEXING

(71) Applicants: Thermo Finnigan LLC, San Jose, CA (US); University of Washington, Seattle, WA (US)

(72) Inventors: Philip M. Remes, Livermore, CA (US); Michael J. MacCoss, Seattle, WA (US); Jarrett Egertson, Rancho Palos Verdes, CA (US)

(73) Assignees: Thermo Finnigan LLC, San Jose, CA (US); University of Washington, Seattle, WA (US)

(*) Notice: Subject to any disclaimer, the term of this patent is extended or adjusted under 35 U.S.C. 154(b) by 348 days.

(21) Appl. No.: 18/377,481

(22) Filed: Oct. 6, 2023

(65) Prior Publication Data

US 2025/0118545 A1 Apr. 10, 2025

(51) Int. Cl.
*H01J 49/42* (2006.01)

(52) U.S. Cl.
CPC .................................. *H01J 49/421* (2013.01)

(58) Field of Classification Search
USPC .................................................. 250/281, 282
See application file for complete search history.

(56) References Cited

U.S. PATENT DOCUMENTS 9,048,074 B2 6/2015 Senko
9,202,677 B2 12/2015 Tate et al.
9,875,885 B2 1/2018 Remes et al.
9,911,585 B1 * 3/2018 Zabrouskov ........ H01J 49/0031
10,170,290 B2 1/2019 Remes
2012/0156707 A1 * 6/2012 Hartmer ................ H01J 49/145 435/23
2020/0051800 A1 2/2020 McAlister et al.

(Continued)

OTHER PUBLICATIONS

Amodei, D. et.al. "Improving Precursor Selectivity in Data-Independent Acquisition Using Overlapping Windows", J. Am. Soc. Mass Spectrom. Revised: Dec. 3, 2018/Accepted: Dec. 5, 2018/ Published Online: Jan. 22, 2019 (2019) 30:669Y684. DOI: 10.1007/ s13361-018-2122-8.

(Continued)

*Primary Examiner* — Kiet T Nguyen
(74) *Attorney, Agent, or Firm* — ALG Intellectual Property, LLC

(57) ABSTRACT

A system may control a mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range. The precursor m/z range is divided into a plurality of isolation window units. The parallel isolation window includes, for each acquisition of the acquisition cycle, a set of isolation sub-windows corresponding to a distinct set of isolation window units of the precursor m/z range. At least two adjacent isolation sub-windows of the parallel isolation window are non-contiguous. Each isolation window unit of the precursor m/z range is analyzed at least twice during the acquisition cycle. A mass spectrum for the precursor m/z range may be generated based on the set of mass spectra acquired during the acquisition cycle.

29 Claims, 13 Drawing Sheets

(56) References Cited

U.S. PATENT DOCUMENTS

| | | | | |
|---|---|---|---|---|
| 2020/0266041 | A1 | 8/2020 | Zhang et al. | |
| 2022/0165556 | A1 * | 5/2022 | Remes ................ | H01J 49/0045 |

OTHER PUBLICATIONS

Egertson, J., et al. "Multiplexed MS/MS for Improved Data Independent Acquisition", Nat Methods. Author manuscript; available in PMC Feb. 1, 2014. Nat Methods. Aug. 2013 ; 10(8): 744-746. doi: 10.1038/nmeth.2528.

Londry, F.A. et al., "Mass Selective Axial lon Ejection from a Linear Quadrupole lon Trap", MDS SCIEX, Concord, Ontario, Canada. 2003 American Society for Mass Spectrometry. Published by Elsevier Inc. J Am Soc Mass Spectrom 2003, 14, 1130-1147. Revised Jun. 4, 2003. doi: 10.1016/S1044-0305(03)00446-X Accepted Jun. 4, 2003. Published online Aug. 11, 2003.

Song, Q., et al. "Mass Selection of lons from Beams Using Waveform Isolation in Radiofrequency Quadrupoles", (2009) Analytical Chemistry, 81(5), 1833-1840. doi:10.1021/ac802213p.

EP24204015.2, Extended European Search Report, Mar. 6, 2025, 10 pages.

Ludwig C., et al., "Data-independent Acquisition-based SWATH-MS for Quantitative Proteomics: a Tutorial," Molecular Systems Biology, Aug. 13, 2018, vol. 14, No. 8, XP055532336, 23 pages.

* cited by examiner

DATA INDEPENDENT ACQUISITION WITH PARALLEL ISOLATION MULTIPLEXING

STATEMENT OF GOVERNMENT SUPPORT

This invention was made with government support under Grant Nos. P41 GM103533 and R21 CA192983, awarded by the National Institutes of Health. The government has certain rights in the invention.

BACKGROUND INFORMATION

A mass spectrometer is a sensitive instrument that may be used to detect, identify, and/or quantify molecules based on the mass-to-charge ratio (m/z) of ions produced from the molecules. A mass spectrometer generally includes an ion source for producing ions from molecules included in a sample, a mass analyzer for separating the ions based on their m/z, and an ion detector for detecting the separated ions. The mass spectrometer may include or be connected to a computer-based software platform that uses data from the ion detector to construct a mass spectrum that shows a relative abundance of each of the detected ions as a function of m/z. The mass spectrum may be used to detect and quantify molecules in simple and complex mixtures. A separation system, such as a liquid chromatograph (LC), gas chromatograph (GC), or capillary electrophoresis (CE) system, may be coupled to the mass spectrometer in a combined system (e.g., LC-MS, GC-MS, or CE-MS system) to separate components in the sample before the components are introduced to the mass spectrometer.

One application of mass spectrometry is the identification, quantification, and structural elucidation of peptides, proteins, and related molecules in complex biological samples. In some such experiments, such as multi-stage mass spectrometry (MSn where n is 2 or more) or tandem mass spectrometry (a form of multi-stage mass spectrometry where n is 2, often denoted MS/MS or MS2), certain ions are isolated and then fragmented in a controlled manner to yield product ions. A mass analysis is then performed on the product ions to generate mass spectra of the product ions. The mass spectra of the product ions provide information that may be used to confirm identification, determine quantity, and/or derive structural details regarding analytes of interest.

Various techniques may be used to acquire mass spectra using multi-stage mass spectrometry. One commonly used technique is data-dependent acquisition (DDA), which uses data acquired in one mass analysis to select, based on predetermined criteria, one or more ion species or a narrow m/z range for isolation and fragmentation of the selected ion species and subsequent mass analysis of the fragment ions (product ions). For example, the mass spectrometer may perform a full MS survey scan of precursor ions over a wide precursor m/z range and then select one or more precursor ion species from the resulting spectra for subsequent MS/MS or MSn analysis. The criteria for selection of precursor ion species may include intensity, charge state, m/z, inclusion/exclusion lists, or isotopic patterns. The main disadvantage of the DDA technique is the inherently random nature of the results. When technical replicates of the same sample or comparative analysis on other samples is performed, some analytes may be measured in one experiment but not in others. This frustrates attempts to perform reproducible analyses and is known as the “missing value problem”.

In contrast to DDA, data-independent acquisition (DIA) is a technique in which all precursor ion species within a wide precursor m/z range (e.g., 500-900 m/z) are isolated and fragmented via a sequentially advancing isolation window of a fixed m/z width (e.g., 20 m/z) to generate product ions. An MS/MS or MSn analysis is then performed on the product ions in a methodical and unbiased manner. The acquisition of the set of mass spectra spanning the full precursor m/z range constitutes one acquisition cycle, which is repeated to generate MS/MS or MSn mass spectra of the product ions. In the DIA technique, isolation and fragmentation of one or more precursor ion species is not dependent on data acquired in a survey mass analysis, as in DDA, and is much more suitable for comparing results across different samples than DDA. An advantage of DIA is reproducible sampling, which eliminates the missing value problem inherent in DDA techniques.

However, due to limitations in instrument speed and sensitivity, there is tension among the isolation width, the precursor m/z range, and the acquisition cycle time parameters. The acquisition cycle time is typically chosen to be a value less than or equal to the typical LC peak width divided by about six, where the m/z range is to be completely sampled in the acquisition cycle time, so that the areas of the eluting compounds can be accurately integrated. Generally, wider isolation widths enable a wider precursor m/z range and thus analysis of a greater number of precursor ion species but produce lower quality data because a wide isolation window may result in co-isolation and co-fragmentation of neighboring analytes, resulting in complex, unidentifiable, or low scoring spectra. On the other hand, narrower isolation windows produce better quality data with greater sensitivity at the expense of fewer precursor ion species that may be analyzed due to the narrower precursor m/z range. For example, at the extreme of very narrow isolation widths, the data have the highest quality in terms of sensitivity and selectivity, but the smallest range of precursor ion species are analyzed. Conversely, at the extreme of wide isolation widths, a larger range of precursor ion species may be analyzed but the quality of the resulting data is compromised because the dynamic range of quantitation may suffer, and the spectra may have mixed signals produced by many different analytes. Thus, the spectra are difficult to interpret.

SUMMARY

The following description presents a simplified summary of one or more aspects of the methods and systems described herein to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, a system comprises: one or more processors; and memory storing executable instructions that, when executed by the one or more processors, cause a computing device to perform a process including: controlling a mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range; wherein: the precursor m/z range is divided into a plurality of isolation window units; the parallel isolation window includes, for each acquisition of the acquisition cycle, a set of isolation sub-windows corresponding to a distinct set of isolation window units of the precursor m/z range; at least two adjacent isolation sub-windows of the parallel isolation window are non-contiguous; and each isolation window unit of the precursor m/z range is analyzed at least twice during the acquisition cycle.

In some illustrative examples, a system comprises: a mass spectrometer; and a controller configured to control the mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range; wherein: the precursor m/z range is divided into a plurality of isolation window units; the parallel isolation window includes, for each acquisition of the acquisition cycle, a set of isolation sub-windows corresponding to a distinct set of isolation window units of the precursor m/z range; at least two adjacent isolation sub-windows of the parallel isolation window are non-contiguous; and each isolation window unit of the precursor m/z range is analyzed at least twice during the acquisition cycle.

In some illustrative examples, a non-transitory computer-readable medium stores instructions that, when executed, direct at least one processor of a computing device for mass spectrometry to perform a process including: controlling a mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range; wherein: the precursor m/z range is divided into a plurality of isolation window units; the parallel isolation window includes, for each acquisition of the acquisition cycle, a set of isolation sub-windows corresponding to a distinct set of isolation window units of the precursor m/z range; at least two adjacent isolation sub-windows of the parallel isolation window are non-contiguous; and each isolation window unit of the precursor m/z range is analyzed at least twice during the acquisition cycle.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
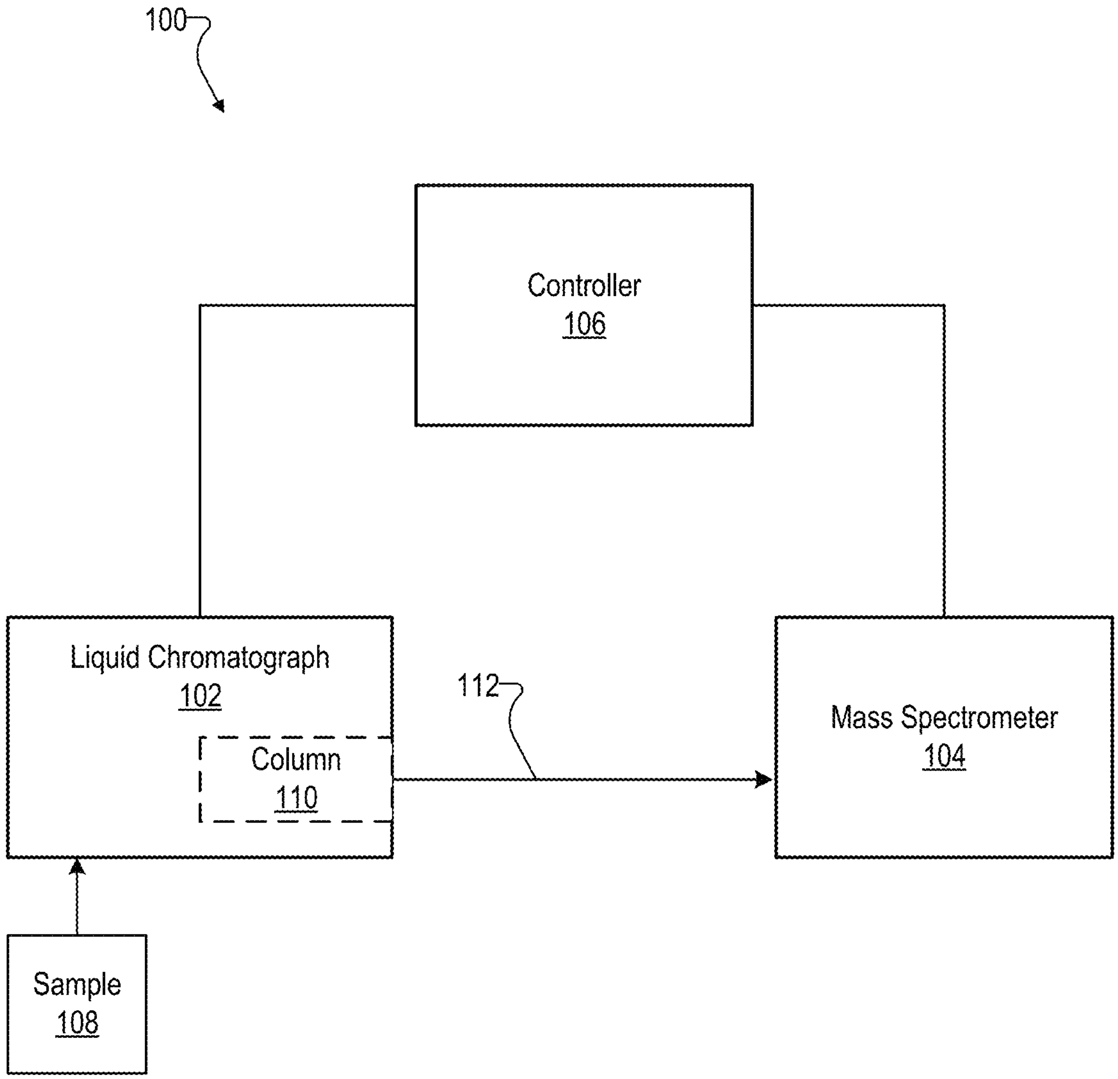
FIG. 1 shows a functional diagram of an illustrative LC-MS system.

Systems, apparatuses, and methods of performing data independent acquisition (DIA) with parallel isolation multiplexing are described herein. For example, a system may control a mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range. The precursor m/z range is divided into a plurality of isolation window units. The parallel isolation window includes, for each acquisition of the acquisition cycle, a set of isolation sub-windows corresponding to a distinct set of isolation window units of the precursor m/z range. At least two adjacent isolation sub-windows of the parallel isolation window are non-contiguous. Each isolation window unit of the precursor m/z range is analyzed at least twice during the acquisition cycle. A mass spectrum for the precursor m/z range may be generated based on the set of mass spectra acquired during the acquisition cycle. For example, the set of mass spectra may be demultiplexed to assign one or more signals in the set of mass spectra to their appropriate isolation window unit of the precursor m/z range.

The systems, apparatuses, and methods described herein improve sensitivity of DIA analyses, as compared with traditional DIA techniques, by using a relatively wide parallel isolation width. At the same time, selectivity is improved as compared with traditional DIA techniques by utilizing one or more m/z gaps between isolation sub-windows, which increases the diversity with which an isolation window unit of the precursor m/z range is analyzed in a set of mass spectra acquired during an acquisition cycle. For example, the selectivity of a demultiplexed mass spectrum may be measured as the isolation width of the parallel isolation window divided by the number of different overlaps of each isolation window unit per acquisition cycle. Thus, a demultiplexed mass spectrum generated based on a parallel isolation window having a parallel isolation width of 8 m/z would have a selectivity less than 8 m/z (e.g., 4 m/z or 2 m/z). Moreover, the use of a wide parallel isolation width enables coverage of a wider precursor m/z range, as compared with traditional DIA techniques, thereby increasing throughput.

Various embodiments will now be described in more detail with reference to the figures. The systems and methods described herein may provide one or more of the benefits mentioned above and/or various additional and/or alternative benefits that will be made apparent herein.

In some implementations, the methods and systems for performing DIA with parallel isolation may be used in conjunction with a combined separation-mass spectrometry system, such as an LC-MS system. As such, an LC-MS system will now be described. The described LC-MS system is illustrative and not limiting. The methods and systems described herein may operate as part of or in conjunction with the LC-MS system described herein and/or with any other suitable separation-mass spectrometry system, including a high-performance liquid chromatography-mass spectrometry (HPLC-MS) system, a gas chromatography-mass spectrometry (GC-MS) system, or a capillary electrophoresis-mass spectrometry (CE-MS) system. The methods and systems described herein may also operate in conjunction with any other continuous flow sample source, such as a flow-injection mass spectrometry system (FI-MS) in which analytes are injected into a mobile phase (without separation in a column) and enter the mass spectrometer with time-dependent variations in intensity (e.g., Gaussian-like peaks).

FIG. 1 shows a functional diagram of an illustrative LC-MS system 100. LC-MS system 100 includes a liquid chromatograph 102, a mass spectrometer 104, and a controller 106. Liquid chromatograph 102 is configured to separate, over time, components (e.g., analytes) within a sample 108 that is injected into liquid chromatograph 102. Sample 108 may include, for example, chemical components (e.g., molecules, ions, etc.) and/or biological components (e.g., metabolites, proteins, peptides, lipids, etc.) for detection and analysis by LC-MS system 100. Liquid chromatograph 102 may be implemented by any liquid chromatograph as may suit a particular implementation. In liquid chromatograph 102, sample 108 may be injected into a mobile phase (e.g., a solvent), which carries sample 108 through a column 110 containing a stationary phase (e.g., an adsorbent packing material). As the mobile phase passes through column 110, components within sample 108 elute from column 110 at different times based on, for example, their size, their affinity to the stationary phase, their polarity, and/or their hydrophobicity.

A detector (e.g., an ion detector component of mass spectrometer 104, an ion-electron converter and electron multiplier, etc.) may measure the relative intensity of a signal modulated by each separated component in eluate 112 from column 110. Data generated by the detector may be represented as a chromatogram, which plots retention time on the x-axis and a signal representative of the relative intensity on the y-axis. The retention time of a component is generally measured as the period of time between injection of sample 108 into the mobile phase and the relative intensity peak maximum after chromatographic separation. In some examples, the relative intensity may be correlated to or representative of relative abundance of the separated components. Data generated by liquid chromatograph 102 may be output to controller 106.

In some cases, particularly in analyses of complex mixtures, multiple different components in sample 108 co-elute from column 110 at approximately the same time, and thus may have the same or similar retention times. As a result, determination of the relative intensity of the individual components within sample 108 requires further separation of signals attributable to the individual components. To this end, liquid chromatograph 102 directs components included in eluate 112 to mass spectrometer 104 for identification and/or quantification of one or more of the components.

Mass spectrometer 104 is configured to produce ions from the components received from liquid chromatograph 102 and sort or separate the produced ions based on m/z of the ions. A detector in mass spectrometer 104 measures the intensity of the signal produced by the ions. As used herein, "intensity" or "signal intensity" refers to the response of the detector and may represent absolute abundance, relative abundance, ion count, intensity, relative intensity, ion current, or any other suitable measure of ion detection. Data generated by the detector may be represented by mass spectra, which plot the intensity of the observed signal as a function of m/z of the detected ions. Data acquired by mass spectrometer 104 may be output to controller 106.

Mass spectrometer 104 may be implemented by a multi-stage mass spectrometer configured to perform multi-stage mass spectrometry (also denoted MSn). In some examples, the mass spectrometer is a tandem mass spectrometer configured to perform tandem mass spectrometry. Tandem mass spectrometry (MS/MS) is a form of multi-stage mass spectrometry (MSn) where the number of stages (n) is 2. As used herein, multi-stage mass spectrometry refers to MS/MS as well as MSn mass spectrometry where n is greater than two.

Controller 106 may be communicatively coupled with, and configured to control operations of, LC-MS system 100 (e.g., liquid chromatograph 102 and mass spectrometer 104). Controller 106 may include any suitable hardware (e.g., a processor, circuitry, etc.) and/or software configured to control operations of and/or interface with the various components of LC-MS system 100 (e.g., liquid chromatograph 102 or mass spectrometer 104).

Figure 2:
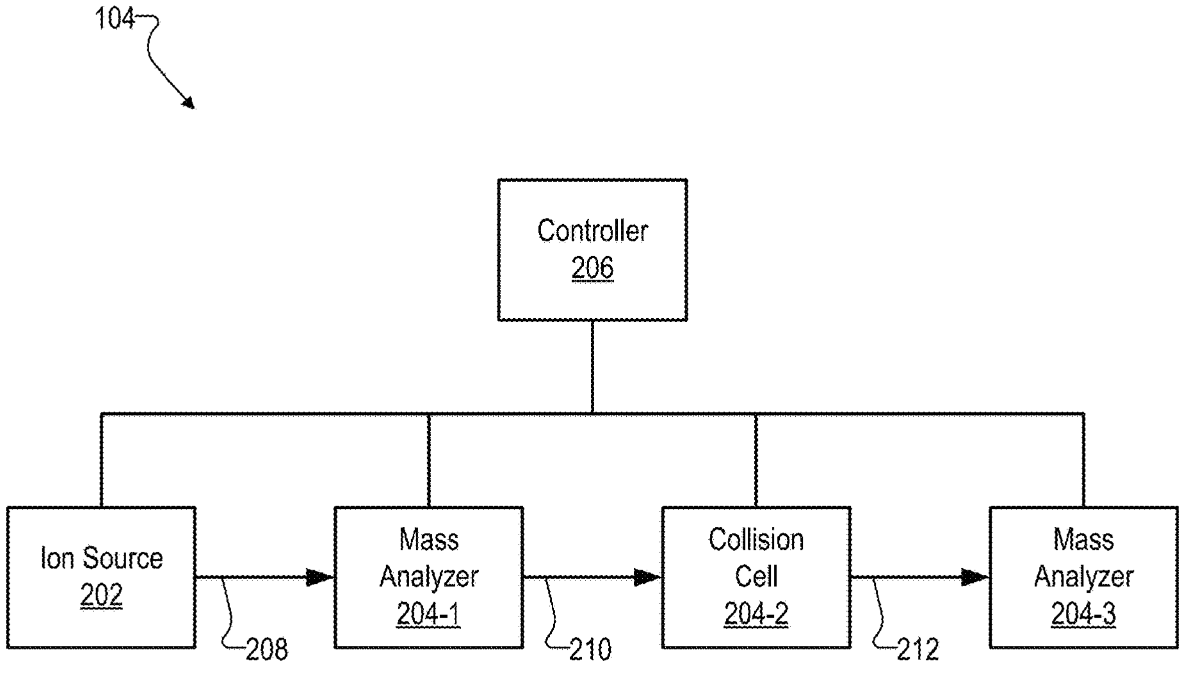
FIG. 2 shows a functional diagram of an illustrative implementation of mass spectrometer that may be included in the LC-MS system of FIG. 1.

FIG. 2 shows a functional diagram of an illustrative implementation of mass spectrometer 104. As shown, mass spectrometer 104 is tandem-in-space (e.g., has multiple mass filters and/or mass analyzers) and has two stages for performing MS/MS. However, mass spectrometer 104 is not limited to this configuration but may have any other suitable configuration. For example, mass spectrometer 104 may be tandem-in-time. Additionally or alternatively, mass spectrometer 104 may be a multi-stage mass spectrometer with three or more stages for performing multi-stage tandem mass spectrometry (e.g., MS/MS/MS).

As shown, mass spectrometer 104 includes an ion source 202, a first mass analyzer 204-1, a collision cell 204-2, a second mass analyzer 204-3, and a controller 206. Mass spectrometer 104 may further include any additional or alternative components not shown as may suit a particular implementation (e.g., ion optics, filters, lenses, ion stores, an autosampler, a detector, etc.).

Ion source 202 is configured to produce a stream 208 of ions from the components and deliver the ions to first mass analyzer 204-1. Ion source 202 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 202 may include various components for producing ions from components included in sample 108 and delivering the ions to first mass analyzer 204-1.

First mass analyzer 204-1 is configured to receive ion stream 208, isolate precursor ions of a selected m/z range (e.g., an m/z range of a parallel isolation window) and deliver a beam 210 of precursor ions to collision cell 204-2. Collision cell 204-2 is configured to receive beam 210 of precursor ions and produce product ions (e.g., fragment ions) via controlled dissociation processes. Collision cell 204-2 directs a beam 212 of product ions to second mass analyzer 204-3. Second mass analyzer 204-3 is configured to filter and/or perform a mass analysis of the product ions.

Mass analyzers 204-1 and 204-3 are configured to isolate or separate ions according to m/z of each of the ions. Mass analyzers 204-1 and 204-3 may be implemented by any suitable mass analyzer, such as a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. an orbital electrostatic trap such as an Orbitrap mass analyzer, a Kingdon trap, etc.), a Fourier transform ion cyclotron resonance (FT-ICR) mass analyzer, and the like. Mass analyzers 204-1 and 204-3 need not be implemented by the same type of mass analyzer.

Collision cell 204-2 may be implemented by any suitable collision cell. As used herein, "collision cell" may encompass any structure or device configured to produce product ions via controlled dissociation processes and is not limited to devices employed for collisionally-activated dissociation. For example, collision cell 204-2 may be configured to fragment precursor ions using collision induced dissociation (CID), electron transfer dissociation (ETD), electron capture dissociation (ECD), photo induced dissociation (PID) (e.g., infrared multiphoton dissociation (IRMPD), blackbody infrared radiative dissociation (BIRD)), surface induced dissociation (SID), negative electron-transfer dissociation (NETD), electron-detachment dissociation (EDD), higher-energy C-trap dissociation (HCD), charge remote fragmentation, ion/molecule reactions, and the like.

An ion detector (not shown) is configured to detect ions at each of a variety of different m/z and responsively generate an electrical signal representative of ion intensity. The electrical signal is transmitted to controller 206 for processing, such as to construct a mass spectrum of the sample. For example, mass analyzer 204-3 may emit an emission beam of separated ions to the ion detector, which is configured to detect the ions in the emission beam and generate or provide data that can be used by controller 206 to construct a mass spectrum of the sample. The ion detector may be implemented by any suitable detection device, including without limitation an electron multiplier, a Faraday cup, and the like.

Controller 206 may be communicatively coupled with, and configured to control operations of, mass spectrometer 104. For example, controller 206 may be configured to control operation of various hardware components included in ion source 202 and/or mass analyzers 204-1 and 204-3. To illustrate, controller 206 may be configured to control an accumulation time of ion source 202 and/or mass analyzers 204, control an oscillatory voltage power supply and/or a DC power supply to supply a radio frequency (RF) voltage and/or a direct current (DC) voltage to mass analyzers 204, adjust values of the RF voltage and DC voltage to select an effective m/z (including a mass tolerance window) for analysis, and adjust the sensitivity of the ion detector (e.g., by adjusting the detector gain).

Controller 206 may also include and/or provide a user interface configured to enable interaction between a user of mass spectrometer 104 and controller 206. The user may interact with controller 206 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 206. In other examples the display device and/or input device may be separate from, but communicatively coupled to, controller 206. For instance, the display device and the input device may be included in a computer (e.g., a desktop computer, a laptop computer, etc.) communicatively connected to controller 206 by way of a wired connection (e.g., by one or more cables) and/or a wireless connection.

Controller 206 may include any suitable hardware (e.g., a processor, circuitry, etc.) and/or software as may serve a particular implementation. While FIG. 2 shows that controller 206 is included in mass spectrometer 104, controller 206 may alternatively be implemented in whole or in part separately from mass spectrometer 104, such as by a computing device communicatively coupled to mass spectrometer 104 by way of a wired connection (e.g., a cable) and/or a network (e.g., a local area network, a wireless network (e.g., Wi-Fi), a wide area network, the Internet, a cellular data network, etc.). In some examples, controller 206 may be implemented in whole or in part by controller 106.

Figure 3:
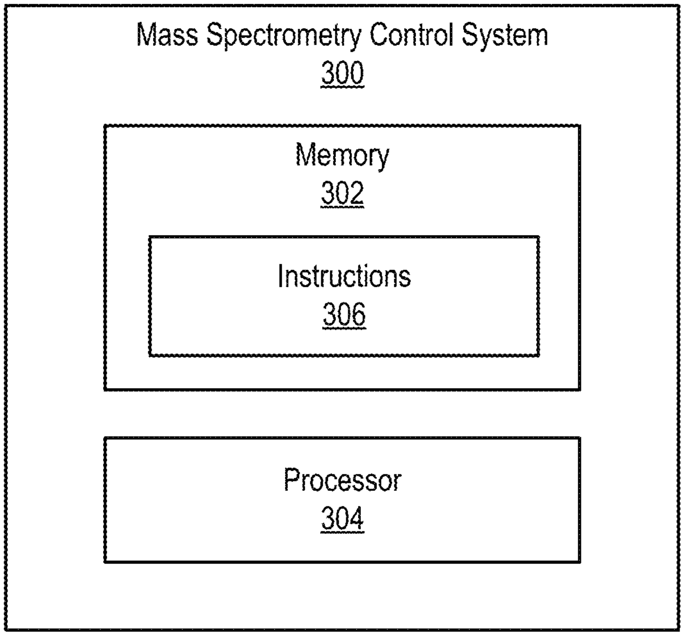
FIG. 3 shows a functional diagram of an illustrative mass spectrometry control system.

LC-MS system 100 may be used in conjunction with a mass spectrometry control system to perform a DIA experiment with parallel isolation multiplexing. FIG. 3 shows a functional diagram of an illustrative mass spectrometry control system 300 ("system 300"). System 300 may be implemented entirely or in part by LC-MS system 100 (e.g., by controller 106 and/or controller 206). Alternatively, system 300 may be implemented separately from LC-MS system 100 (e.g., a remote computing system or server separate from but communicatively coupled to controller 106 and/or controller 206).

System 300 may include, without limitation, a memory 302 and a processor 304 selectively and communicatively coupled to one another. Memory 302 and processor 304 may each include or be implemented by hardware and/or software components (e.g., processors, memories, communication interfaces, instructions stored in memory for execution by the processors, etc.). In some examples, memory 302 and processor 304 may be distributed between multiple devices and/or multiple locations as may serve a particular implementation.

Memory 302 may maintain (e.g., store) executable data used by processor 304 to perform any of the operations described herein. For example, memory 302 may store instructions 306 that may be executed by processor 304 to perform any of the operations described herein. Instructions 306 may be implemented by any suitable application, software, code, and/or other executable data instance.

Memory 302 may also maintain any data acquired, received, generated, managed, used, and/or transmitted by processor 304. For example, memory 302 may maintain LC-MS data (e.g., acquired chromatogram data and/or mass spectra data) and/or a demultiplexing algorithm, as described below.

Processor 304 may be configured to perform (e.g., execute instructions 306 stored in memory 302 to perform) various processing operations described herein. For example, system 300 may control a mass spectrometer to acquire, by a plurality of acquisitions constituting an acquisition cycle, a set of mass spectra of product ions derived from precursor ions isolated based on a parallel isolation window successively positioned throughout a precursor mass-to-charge ratio (m/z) range. System 300 may also generate, based on the set of mass spectra acquired at operation 402, a mass spectrum for the precursor m/z range. In some examples, system 300 demultiplexes the set of mass spectra to determine a signal for each isolation window unit of the plurality of isolation window units.

It will be recognized that the operations and examples described herein are merely illustrative of the many different types of operations that may be performed by processor 304. In the description herein, any references to operations performed by system 300 may be understood to be performed by processor 304 of system 300. Furthermore, in the description herein, any operations performed by system 300 may be understood to include system 300 directing or instructing another system or device to perform the operations.

Figure 4:
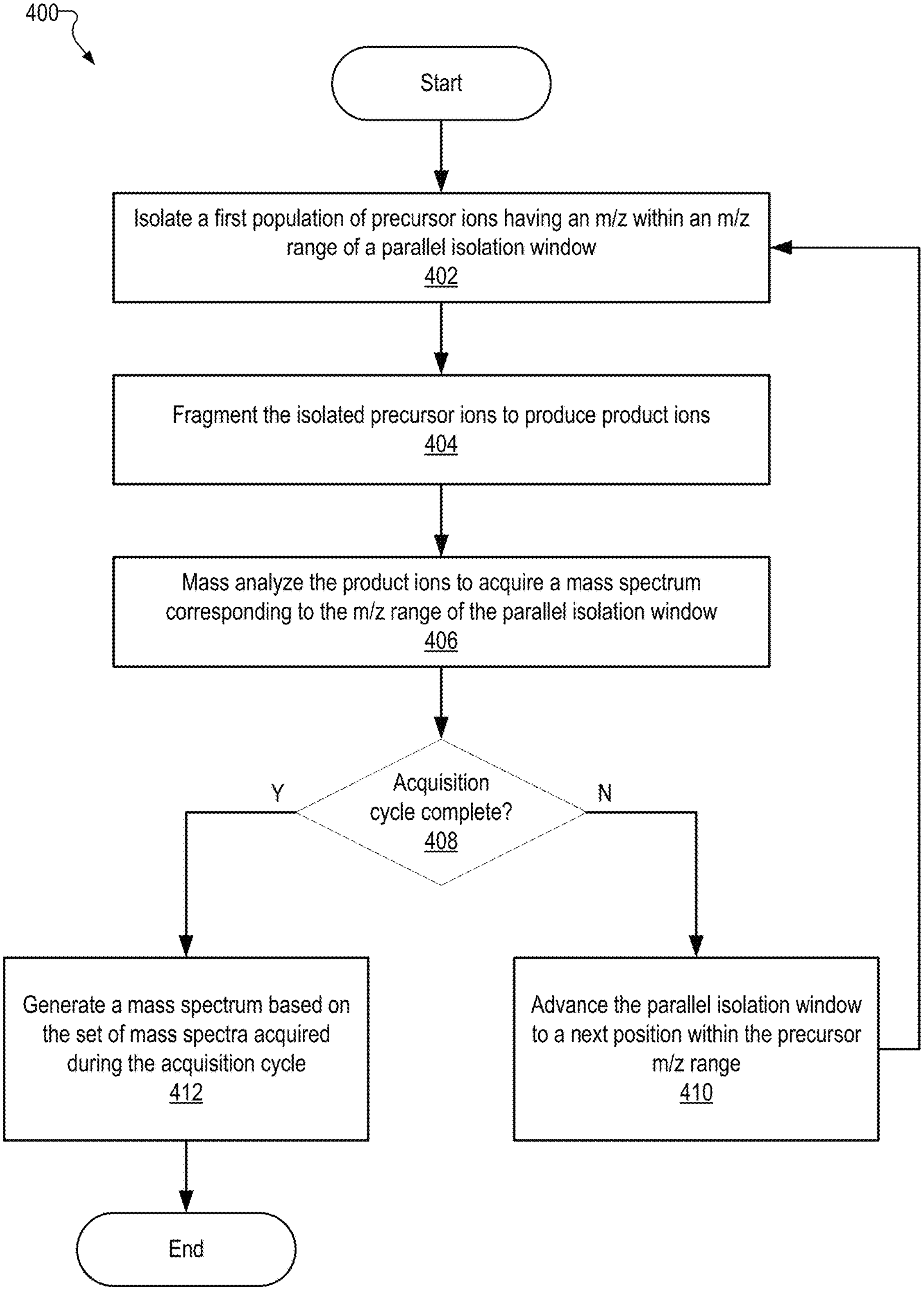
FIG. 4 shows an illustrative method of performing a DIA experiment with parallel isolation multiplexing.

FIG. 4 shows an illustrative method 400 of performing a DIA experiment with parallel isolation multiplexing. While FIG. 4 shows illustrative operations according to one embodiment, other embodiments may omit, add to, reorder, and/or modify any of the operations shown in FIG. 4. One or more of the operations shown in FIG. 4 may be performed by LC-MS system 100 and/or system 300, any components included therein, and/or any implementations thereof (e.g., mass spectrometer 104, one or more components of mass spectrometer 104, and/or a remote computing system separate from but communicatively coupled to mass spectrometer 104).

At operation 402, a first population of precursor ions having an m/z within an m/z range of a parallel isolation window are isolated using parallel isolation. Parallel isolation using a parallel isolation window will be described below in more detail.

At operation 404, the isolated precursor ions are fragmented to produce product ions. The isolated precursor ions may be fragmented in any suitable way.

At operation 406, the product ions are mass analyzed to acquire a mass spectrum corresponding to the m/z range of the parallel isolation window.

Operations 402 to 406 constitute one acquisition of the acquisition cycle, and the mass spectrum acquired at operation 406 is included in a set of mass spectra acquired during the acquisition cycle.

At operation 408, system 300 determines whether the acquisition cycle is complete. In some examples, the acquisition cycle is complete when each isolation window unit of the precursor m/z range has been mass analyzed a threshold number of times (e.g., at least twice). If system 300 determines that the acquisition cycle is not complete, method 400 advances to operation 410.

At operation 410, the parallel isolation window is moved to a next position within the precursor m/z range. For example, control voltages that set the m/z range of the parallel isolation window may be adjusted for the next acquisition. The next position for the parallel isolation window may be determined in any suitable way, such as based on a preconfigured acquisition cycle schedule or randomly. Processing then returns to operations 402 to 406 to perform another acquisition with the parallel isolation window at the new position. This cycle (operations 402 to 410) is repeated until system 300 determines, at operation 408, that the acquisition cycle is complete, at which point processing advances to operation 412.

At operation 412, a mass spectrum corresponding to the precursor m/z range is generated based on the set of mass spectra acquired during the acquisition cycle (e.g., the set of mass spectra acquired at each operation 408). For example, the set of mass spectra may be demultiplexed to assign one or more signals in the set of mass spectra to an appropriate m/z window. Demultiplexing of the set of mass spectra will be described below in more detail.

Figure 5:
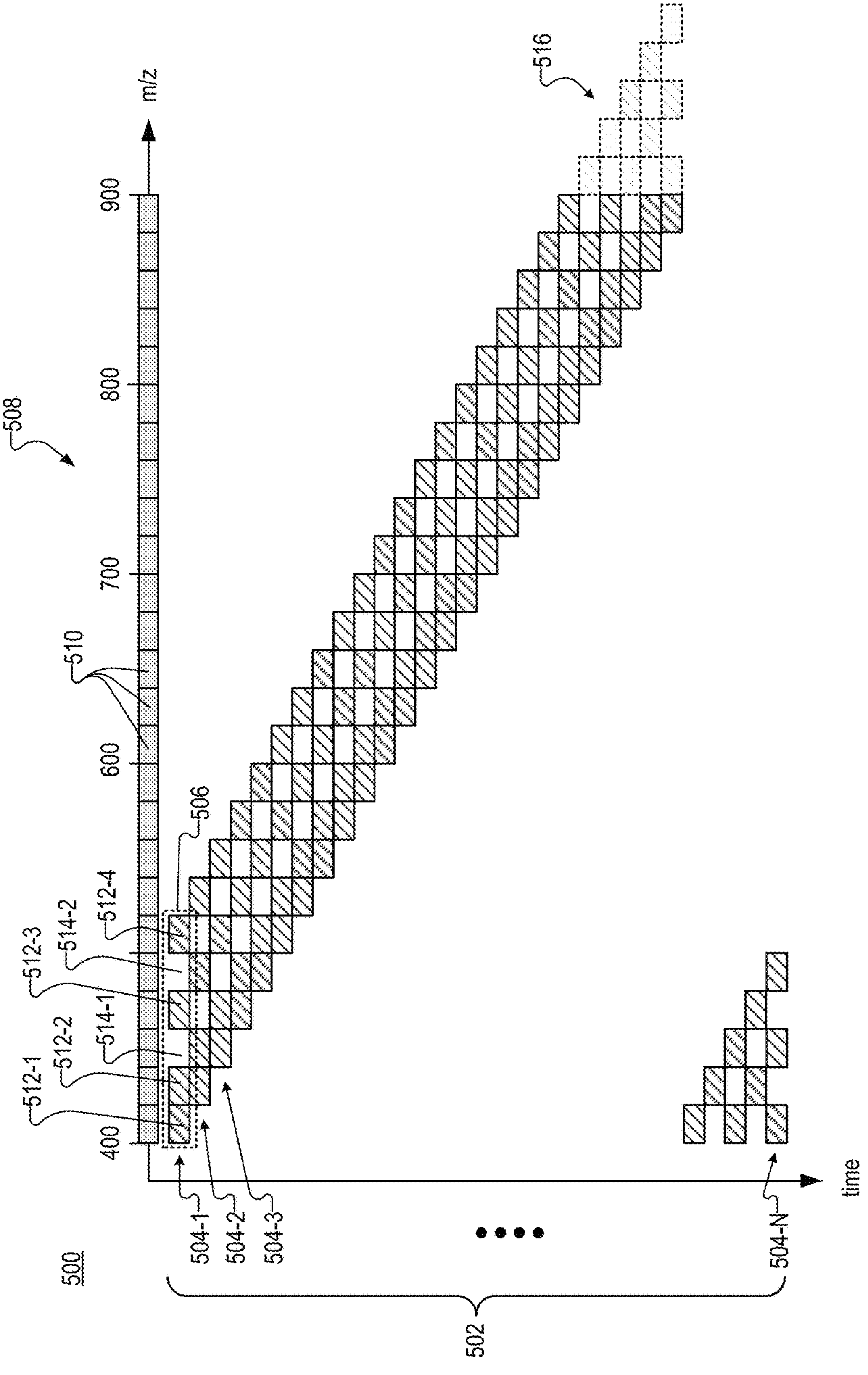
FIG. 5 shows an illustrative acquisition scheme for an acquisition cycle using a parallel isolation window.

FIG. 5 shows an illustrative acquisition scheme 500 for an acquisition cycle using parallel isolation based on a parallel isolation window. Acquisition scheme 500 may be used to implement method 400. However, acquisition scheme 500 is merely illustrative and other acquisition schemes may be used to implement method 400. As shown in FIG. 5, an acquisition cycle 502 comprises a plurality of acquisitions 504 (e.g., acquisitions 504-1, 504-2, 504-3, . . . 504-N). Each acquisition 504 may be performed as described above with respect to operations 402, 404, and 406 of method 400. During acquisition cycle 502, a parallel isolation window 506 is successively positioned (e.g., at operation 410 of method 400) throughout a precursor m/z range 508 over time (e.g., at a different position within precursor m/z range 508 for each acquisition 504) to analyze the entire precursor m/z range 508. In the example of FIG. 5, precursor m/z range 508 spans from 400 m/z to 900 m/z. However, precursor m/z range 508 may span any other range as may suit a particular implementation. Precursor m/z range 508 is divided into a plurality of isolation window units 510 of a fixed unit width. In the example of FIG. 5, isolation window units 510 have a unit width of 20 m/z. However, isolation window units 510 may have any other unit width as may suit a particular implementation. In some examples, isolation window units 510 have a unit width between 1 m/z and 20 m/z, inclusive. In further examples, isolation window units 510 have a unit width between 2 m/z and 10 m/z, inclusive. In yet further examples, isolation window units 510 have a unit width between 2 m/z and 5 m/z, inclusive. In some examples, isolation window units 510 have a unit width between 2 m/z and 4 m/z, inclusive.

Parallel isolation window 506 includes, for each acquisition 504, a set of two or more isolation sub-windows 512 corresponding to a distinct set of isolation window units 510, wherein at least two adjacent isolation sub-windows 512 of parallel isolation window 506 are non-contiguous. As used herein, “adjacent” isolation sub-windows 512 means isolation sub-windows 512 that are neighboring in the plus or minus m/z direction without any intervening isolation sub-window 512. Adjacent isolation sub-windows 512 need not be contiguous. As used herein, “contiguous” means bordering one another with no m/z gap in between. As used herein, “non-contiguous” means not bordering one another such that an m/z gap exists between isolation sub-windows 512. In some examples, an m/z gap has a width in integer multiples of the unit width so that isolation sub-windows 512 of different acquisitions align with one another along the precursor m/z range 508.

In the example of FIG. 5, parallel isolation window 506 includes a set of four isolation sub-windows 512 (e.g., isolation sub-windows 512-1, 512-2, 512-3, and 512-4). Isolation sub-window 512-1 and isolation sub-window 512-2 are adjacent to one another and contiguous with one another. Isolation sub-window 512-2 and isolation sub-window 512-3 are adjacent to one another but are non-contiguous (e.g., an m/z gap 514-1 equal to one unit width is located between isolation sub-window 512-2 and isolation sub-window 512-3). Similarly, isolation sub-window 512-3 and isolation sub-window 512-4 are adjacent to one another but are non-contiguous with one another (e.g., an m/z gap 514-2 equal to one unit width is located between isolation sub-window 512-3 and isolation sub-window 512-4). Isolation sub-window 512-1 is not adjacent to isolation sub-window 512-3 or isolation sub-window 512-4, isolation sub-window 512-2 is not adjacent to isolation sub-window 512-4, isolation sub-window 512-3 is not adjacent to isolation sub-window 512-1, and isolation sub-window 512-4 is not adjacent to isolation sub-window 512-1 or isolation sub-window 512-2.

As used herein, an m/z range of parallel isolation window 506 refers to the total m/z range of only the set of isolation sub-windows 512 of parallel isolation window 506 for a given acquisition 504 and does not include any m/z gaps 514 between isolation sub-windows 512. The isolation width of parallel isolation window 506 is the width of the m/z range of parallel isolation window. Thus, the isolation width of parallel isolation window 506 is 80 m/z (four isolation sub-windows 512 of unit width 20 m/z each). On the other hand, a total m/z span of parallel isolation window 506 refers to the total span of all isolation sub-windows 512 and any m/z gaps 514 between isolation sub-windows 512 for a given acquisition 504. Thus, the width of the total m/z span of parallel isolation window 506 is 120 m/z.

Parallel isolation window 506 is not limited to the configuration shown in FIG. 5 but may have any other suitable configuration (e.g., quantity and/or position of isolation sub-windows 512, parallel isolation width, m/z range, total m/z span). Additionally, m/z gaps 514 may have any other suitable width (e.g., two or more unit widths). Various other illustrative configurations of parallel isolation window 506 will be described below in more detail.

During acquisition cycle 502, parallel isolation window 506 is successively positioned throughout precursor m/z range 508 such that each isolation window unit 510 of precursor m/z range 508 is analyzed multiple times (e.g., by at least two separate acquisitions 504). In some examples, portions of parallel isolation window 506 that would be cut off at the tail end of precursor m/z range 508 (e.g., the set 516 of isolation sub-windows shown in dashed lines and faded hatching beyond 900 m/z) are rolled-over to the beginning of precursor m/z range 508 (beginning at 400 m/z). As shown in FIG. 5, set 516 of isolation sub-windows are rolled over to subsequent acquisitions 504 rather than within their original acquisitions 504 because the m/z gap between rolled-over isolation sub-window 512-4 and isolation sub-window 512-1, which is not rolled over, might be too large for parallel isolation. Generally, parallel isolation becomes difficult with m/z gaps greater than about 100 m/z. In other examples (not shown), set 516 of isolation sub-windows are rolled over within the same acquisitions 504. In further examples, set 516 of isolation sub-windows beyond the upper bounds of precursor m/z range 508 are not rolled over but are included in the acquisitions and the acquired data discarded. In additional or alternative examples, portions of parallel isolation window 506 that would be cut off at the minimum end of precursor m/z range 508 may be treated in a similar, but opposite, manner as set 516 of isolation sub-windows. For example, acquisition cycle 502 may include one or more acquisitions 504 prior to acquisition 504-1, and a set of isolation sub-windows that would be cut off below before 400 m/z may be rolled over to the upper limit of precursor m/z range 508, or the set of isolation sub-windows may be included and the data discarded.

During each acquisition 504, precursor ions having an m/z within the m/z range of parallel isolation window 506 are isolated by parallel isolation (e.g., operation 402) for fragmentation into product ions (e.g., operation 404) to be mass analyzed (e.g., operation 406). Parallel isolation is a technique for simultaneously isolating precursor ions over a non-continuous m/z range (e.g., an m/z range with one or more m/z gaps for which ions are not isolated, such as the m/z range of parallel isolation window 506). Any suitable parallel isolation technique and instrument configuration may be used for parallel isolation.

In some examples, precursor ions are isolated by parallel isolation using parallel waveform isolation techniques. Parallel waveform isolation may be performed with ion traps (e.g., linear quadrupole ion traps) and/or with mass filters (e.g., quadrupole mass filters). For example, in linear ion traps and mass filters, ions are trapped radially by an RF quadrupole field. In linear ion traps, the ions are also trapped axially by static DC potentials at the ends (e.g., at the ends of the quadrupole rod array). Parallel waveform isolation is a technique that applies a broadband auxiliary alternating current (AC) waveform to remove unwanted ions from the population of ions trapped in the ion trap or passing through the mass filter. The broadband auxiliary AC waveform has a frequency profile containing energy at the oscillation frequencies of the unwanted ions, and no energy at the oscillation frequencies of the precursor ions of interest, thus forming one or more "notches" corresponding to the isolated (retained) precursor ions of interest. Various illustrative methods of parallel waveform isolation are described in detail in U.S. Pat. Nos. 10,170,290, 9,875,885, and 9,048,074, each of which is incorporated herein by reference in its entirety.

In other examples, precursor ions are isolated with an ion trap using mass-selective ejection of trapped ions. Mass-selective ejection includes mass-selective radial ejection and mass-selective axial ejection. Mass-selective radial ejection occurs when the RF voltage for the radially-confining RF quadrupole field is increased in the presence of a radially-applied auxiliary AC resonance-ejection voltage, which causes the trapped ions to eject from the ion trap through slots in the quadrupole rods. Mass-selective axial ejection of ions occurs when trapped ions are given some degree of radial excitation via a resonance excitation process, which gives the ions sufficient axial kinetic energy to overcome the static DC exit barrier.

Various different instrument configurations may be used to implement method 400, as will now be described with reference to FIGS. 6A to 6D and 7A to 7C.

Figure 6A:
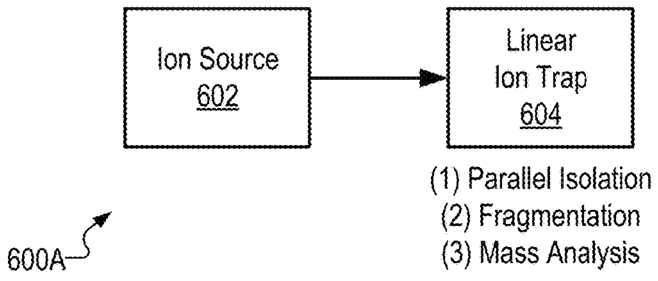
FIGS. 6A to 6D show various illustrative instrument configurations and implementations of the method of FIG. 4.

FIG. 6A shows an illustrative implementation of method 400 using an illustrative instrument configuration 600A. As shown, instrument configuration 600A includes an ion source 602 and an ion trap 604. Ion source 602 may be implemented by any ion source described herein (e.g., by ion source 202). Ion trap 604 may be implemented by any suitable ion trap, such as a linear ion trap (e.g., a linear quadrupole ion trap, a linear hexapole ion trap, a linear octapole ion trap, etc.), a spherical ion trap, a toroidal ion trap, or any other suitable ion trap capable of performing parallel isolation. With this configuration, parallel isolation, fragmentation, and mass analysis are all performed in sequence in ion trap 604. Parallel isolation may be performed using parallel waveform isolation or mass-selective ejection of ions.

Figure 6B:
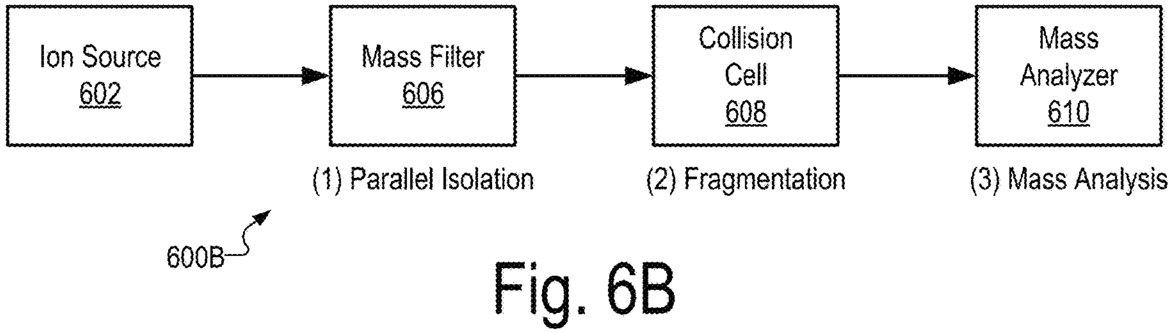

FIG. 6B shows another illustrative implementation of method 400 using an illustrative instrument configuration 600B. As shown, instrument configuration 600B (e.g., a triple quadrupole instrument) includes ion source 602, a mass filter 606 (e.g., a quadrupole mass filter), a collision cell 608 positioned downstream of mass filter 606, and a mass analyzer 610 positioned downstream of collision cell 608. Mass analyzer 610 may be implemented by any suitable mass analyzer, including any mass analyzer described herein (e.g., mass analyzer 204-3). Mass filter 606 performs parallel isolation using parallel waveform isolation as ions pass through mass filter 606. The isolated precursor ions are then accumulated and fragmented in collision cell 608. The resulting product ions are then transferred to mass analyzer 610 for mass analysis. In some examples, a first population of ions (e.g., product ions) are mass analyzed within mass analyzer 610 during a first acquisition (e.g., acquisition 504-1) while a second population of ions (e.g., isolated precursor ions) are isolated by mass filter 606 and fragmented in collision cell 608 during a second acquisition (e.g., acquisition 504-2), thus enabling an increased throughput for the experiment as compared with instrument configuration 600A.

Figure 6C:
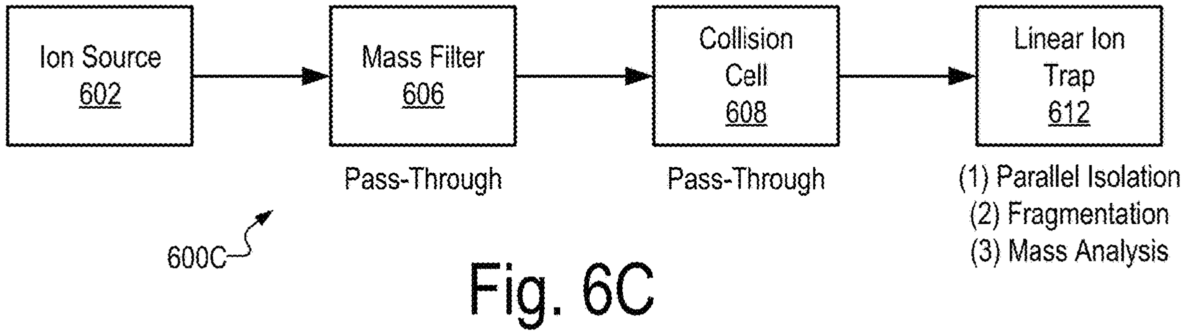

FIG. 6C shows another illustrative implementation of method 400 using an illustrative instrument configuration 600C. As shown, instrument configuration 600C (e.g., a triple quadrupole instrument) includes ion source 602, mass filter 606, collision cell 608, and an ion trap 612 positioned downstream of collision cell 608. Mass filter 606 and collision cell 608 are controlled to pass all ions through to ion trap 612. Alternatively, collision cell 608 is controlled to accumulate ions before ejecting the accumulated ions to ion trap 612. Ion trap 612 then performs parallel isolation of precursor ions (e.g., using parallel waveform isolation or mass-selective ejection), fragmentation of the isolated precursor ions, and mass analysis of the product ions. In some examples, a first population of ions may be processed (e.g., parallel isolated, fragmented, and mass analyzed) within ion trap 612 during a first acquisition (e.g., acquisition 504-1) while a second population of ions is simultaneously accumulated within collision cell 608 during a second acquisition (e.g., acquisition 504-2) until the second population of ions can be transferred to ion trap 612 for parallel isolation, fragmentation, and mass analysis.

Figure 6D:
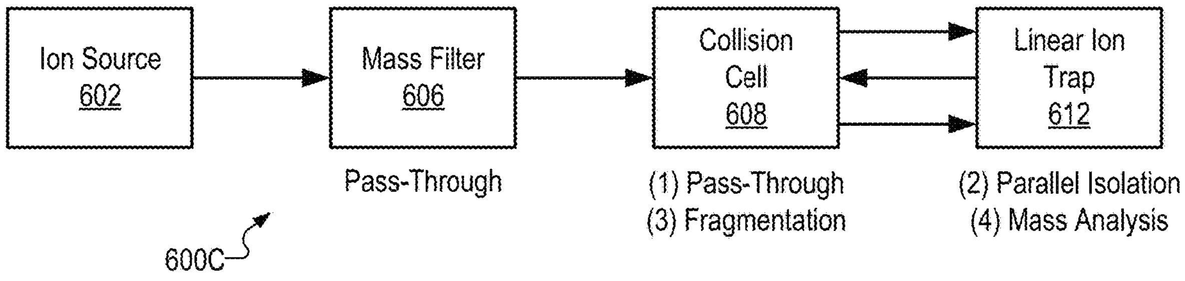

FIG. 6D shows another illustrative implementation of method 400 using instrument configuration 600C. In the example of FIG. 6D, mass filter 606 and collision cell 608 are controlled to pass all ions through to ion trap 612. Ion trap 612 then performs parallel isolation of precursor ions (e.g., using parallel waveform isolation or mass-selective ejection). The isolated precursor ions are then transferred back to collision cell 608 for fragmentation. The resulting product ions are then returned to ion trap 612 for mass analysis.

In the examples of FIGS. 6C and 6D, ions are transferred in bunches, rather than an extended stream, to ion trap 612 for parallel isolation. However, the bunches of precursor ions may suffer from space charge issues in ion trap 612, which hampers parallel waveform isolation techniques for parallel isolation. To prevent space charge issues, the precursor ions may be pre-isolated (e.g., pre-filtered) before being passed to ion trap 612 for parallel isolation, as will now be described with reference to FIGS. 7A to 7C.

Figure 7A:
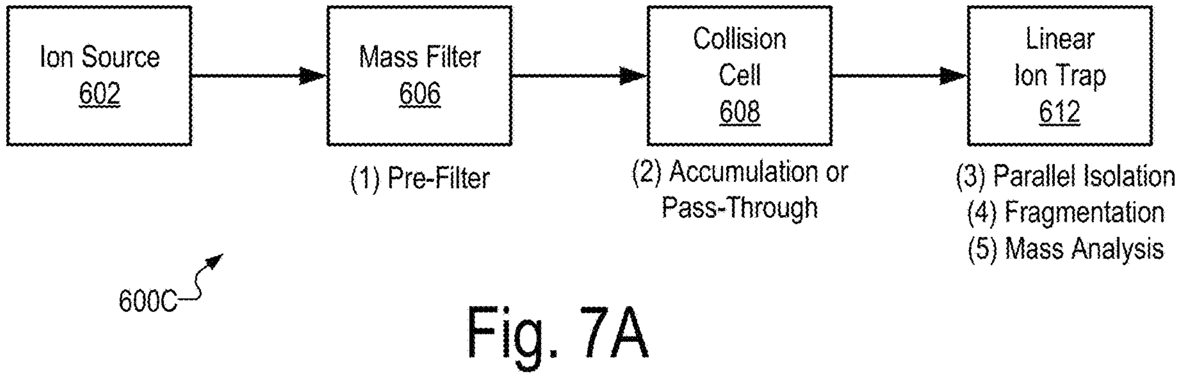
FIGS. 7A to 7C show various additional illustrative instrument configurations and implementations of the method of FIG. 4.

FIG. 7A shows an illustrative implementation of method 400 using instrument configuration 600C. In the example of FIG. 7A, mass filter 606 is controlled to pre-isolate a population of ions having an m/z within the total m/z span of the parallel isolation window. For instance, in scheme 500 (FIG. 5), a total m/z span of parallel isolation window 506 during first acquisition 504-1 ranges from 400 m/z to 520 m/z. Accordingly, mass filter 606 is controlled to pre-isolate ions having an m/z with an isolation window ranging from 400 m/z to 520 m/z (or any other larger isolation window that encompasses the range of 400 m/z to 520 m/z, such as 400 m/z to 540 m/z). Collision cell 608 is controlled to accumulate and/or pass the population of pre-isolated ions through to ion trap 612. Ion trap 612 performs parallel isolation (e.g., using parallel waveform isolation or mass-selective ejection) on the population of pre-isolated ions to isolate a population of precursor ions having an m/z within the m/z range of parallel isolation window 506. The population of precursor ions are thus derived from the population of pre-isolated ions. By performing pre-isolation at mass filter 606, the number of ions that are transferred to ion trap 612 can be decreased to reduce or prevent space charge issues in ion trap 612. Ion trap 612 then performs fragmentation of the population of precursor ions and mass analysis of the resulting population of product ions.

Figure 7B:
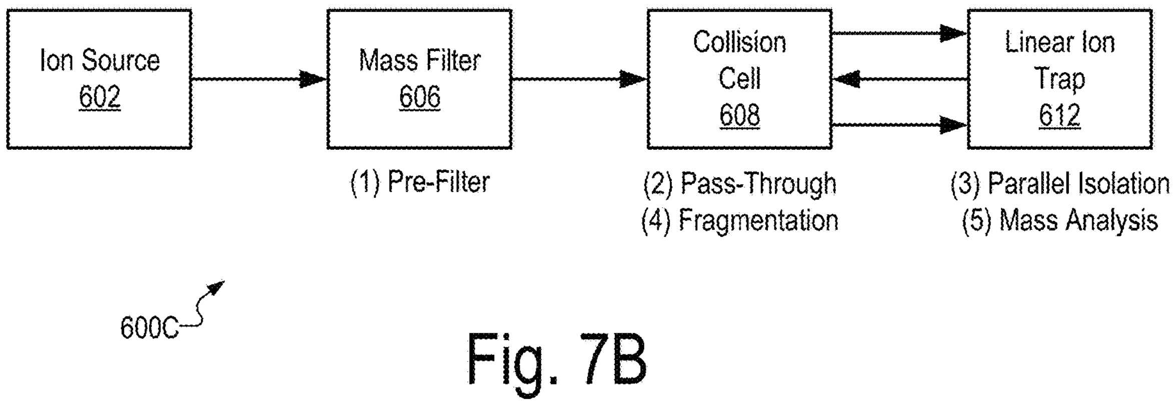

FIG. 7B shows another illustrative implementation of method 400 using instrument configuration 600C. FIG. 7B is similar to FIG. 7A except that, in FIG. 7B, after ion trap 612 performs parallel isolation of the population of precursor ions, the population of precursor ions are transferred back to collision cell 608 for fragmentation. The resulting population of product ions are then returned to ion trap 612 for mass analysis.

Figure 7C:
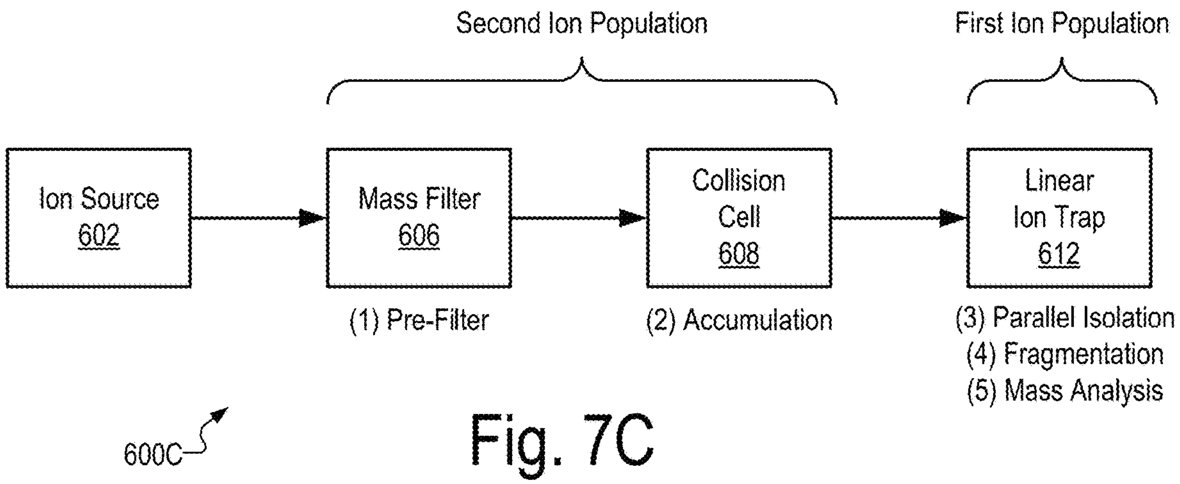

FIG. 7C shows another illustrative implementation of method 400 using instrument configuration 600C. FIG. 7C is similar to FIG. 7A except that, in the example of FIG. 7C, two populations of ions are processed substantially simultaneously. For example, a first ion population is processed (e.g., parallel isolated, fragmented, and mass analyzed) within ion trap 612 during a first acquisition (e.g., acquisition 504-1) while a second ion population is pre-isolated in mass filter 606 and accumulated in collision cell 608 during a second acquisition (e.g., acquisition 504-2). Once the processing of the first ion population is completed in ion trap 612, the second ion population is transferred to ion trap 612 for processing while a third ion population is processed in mass filter 606 and collision cell 608 during a third acquisition (e.g. acquisition 504-3).

Implementation of method 400 is not limited to the examples shown and described with reference to FIGS. 6A to 6D and 7A to 7C, as other implementations and other instrument configurations may be used. For example, other instrument configurations may include multi-stage mass spectrometers having more than two stages.

Demultiplexing of the set of mass spectra acquired during an acquisition cycle to generate a mass spectrum for the precursor m/z range will now be described. Referring again to FIG. 5, each mass spectrum acquired during an acquisition 504 includes signals representing ions derived from precursor ions having an m/z within the m/z range of parallel isolation window 506. However, the signals in the mass spectra cannot be accurately assigned to the appropriate isolation window unit 510 (e.g., the isolation window unit 510 corresponding to the precursor m/z from which the signals are derived). Thus, the mass spectrum has a measure of selectivity equal to the m/z range of parallel isolation window 506 (e.g., four isolation sub-windows 512 in the example of FIG. 5). However, each isolation window unit 510 of precursor m/z range 508 is analyzed multiple times via multiple unique acquisitions 504, which enables demultiplexing of the signals in the set of mass spectra to generate a demultiplexed mass spectrum having improved selectivity. The measure of selectivity of the demultiplexed mass spectrum is equal to the m/z range of parallel isolation window 506 divided by the number of overlaps of each isolation window unit 510 per acquisition cycle 502. Accordingly, the measure of selectivity of the demultiplexed mass spectrum is less than the m/z range of parallel isolation window 506. In the example of FIG. 5, the m/z range of parallel isolation window 506 is four isolation sub-windows 512 (e.g., 80 m/z) and each isolation window unit 510 has four overlaps (e.g., is analyzed in four different acquisitions 504), so the demultiplexed selectivity is one isolation window unit (20 m/z).

Demultiplexing the set of mass spectra uses the overlap-based acquisition scheme of FIG. 5 to assign signals representative of product ions to their appropriate isolation window unit 510 of precursor m/z range 508 (e.g., to the isolation window unit 510 corresponding to the precursor m/z of the product ions). System 300 may demultiplex the set of mass spectra using any suitable demultiplexing algorithm. In some examples, the demultiplexing algorithm uses acquisitions 504 in acquisition cycle 502 to generate a linear system of equations and solves the linear system of equations, such as by using a non-negative least squares technique.

To illustrate, the demultiplexing algorithm may approximate each acquisition 504 in acquisition cycle 502 as a linear superposition of data from each isolation sub-window 512 of the parallel isolation window 506. Each acquisition 504 contains a distinct set of isolation sub-windows 512 (e.g., a set of isolation sub-windows 512 corresponding to a distinct set of isolation window units 510), enabling localization of signals to the appropriate isolation window unit 510 precursor m/z range 508. The demultiplexing algorithm localizes signals from the parallel isolation window 506 to their appropriate isolation window unit 510 by solving a linear system of equations. For example, for each acquisition of interest and for each transition of interest, a set of acquisitions surrounding the acquisition of interest are used to form a linear system of equations relating the measured intensity of each acquisition to the combination of isolation window units analyzed by the acquisition of interest. The matrix equation (1) is then solved:

$$X \cdot A = Y \tag{1}$$

where X is an n×n "design matrix" whose rows represent different acquisitions (plus one regularization row) and whose columns represent isolation window units within the precursor m/z range (n is the number of isolation window units in the precursor m/z range) and whose entries contain a one (1) wherever an acquisition includes a given isolation window unit and a zero (0) where the acquisition does not include the given isolation window unit; Y is the "observed data," an n×m matrix whose rows represent different acquisitions (plus one regularization row) and whose columns represent product ions (m is the number of product ions of interest) and whose entries represent the observed intensity of each transition for each acquisition; and A is an n×m matrix whose rows represent isolation window units and whose columns represent transitions and whose entries represent the unknown isolation window unit intensities that are being solved. Because mass spectrometry signal intensities are required to be positive, matrix equation (1) may be solved using non-negative least squares technique, such as the Lawson-Hanson algorithm. An illustrative demultiplexing algorithm that may be used is described in more detail in Amodei et al., Improving Precursor Selectivity in Data-Independent Acquisition Using Overlapping Windows. *J. Am. Soc. Mass Spectrom.* 2019, 30 (4), 669-684, which is incorporated herein by reference in its entirety.

After acquisition cycle 502 is completed, another acquisition cycle may be performed in the same or a similar manner, and the process may be continuously repeated as analytes elute from the separation system.

As mentioned above, method 400 may be implemented by other acquisition schemes that are different from acquisition scheme 500. Illustrative examples of alternative acquisition schemes will now be described.

Figure 8:
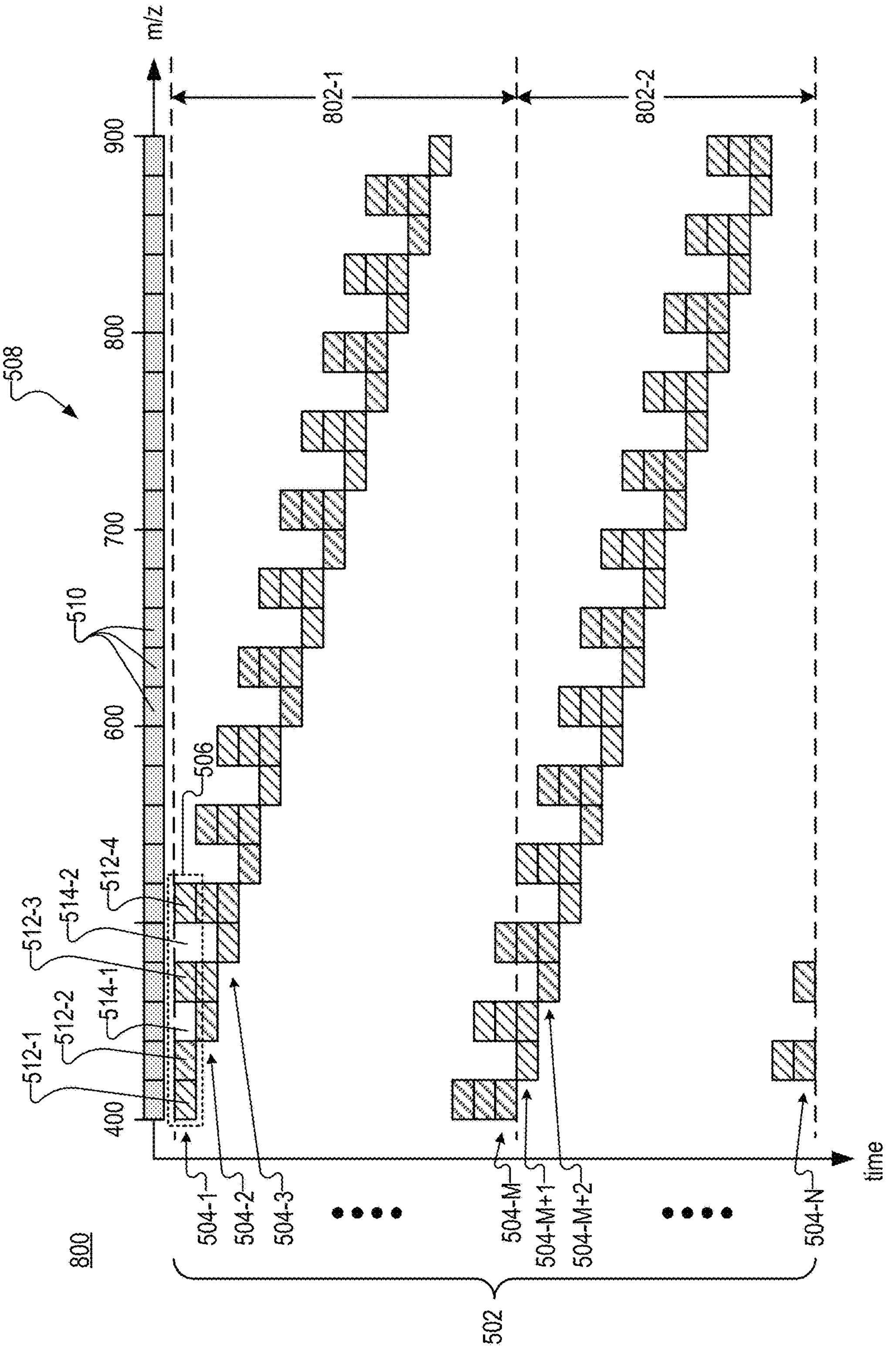
FIGS. 8 to 12 show various illustrative acquisition schemes for acquisition cycles using a parallel isolation window.

FIG. 8 shows another illustrative acquisition scheme 800. Acquisition scheme 800 is similar to acquisition scheme 500 of FIG. 5 except that, in acquisition scheme 800, acquisition cycle 502 includes a first sub-cycle 802-1 including a first sub-set of acquisitions 504 (e.g., acquisitions 504-1, 504-2, 504-3, to 504-M) and a second sub-cycle 802-2 including a second sub-set of acquisitions 504 (e.g., acquisitions 504-M+1, 504-M+2, to 504-N). Second sub-cycle 802-2 is performed after first sub-cycle 802-1. Parallel isolation window 506 is successively positioned throughout precursor m/z range 508 such that each isolation window unit 510 of precursor m/z range 508 is analyzed at least once during first sub-cycle 802-1. Similarly, parallel isolation window 506 is successively positioned throughout precursor m/z range 508 such that each isolation window unit 510 of precursor m/z range 508 is analyzed at least once during second sub-cycle 802-2.

With the dual sub-cycle ordering of acquisitions 504 of acquisition scheme 800, the entire precursor m/z range 508 is analyzed more frequently as compared with acquisition scheme 500 (e.g., at twice the sampling frequency of acquisition scheme 500). This higher-frequency sampling may be configured to achieve sampling at or above the Nyquist limit or any other desired or required frequency.

Figure 9:
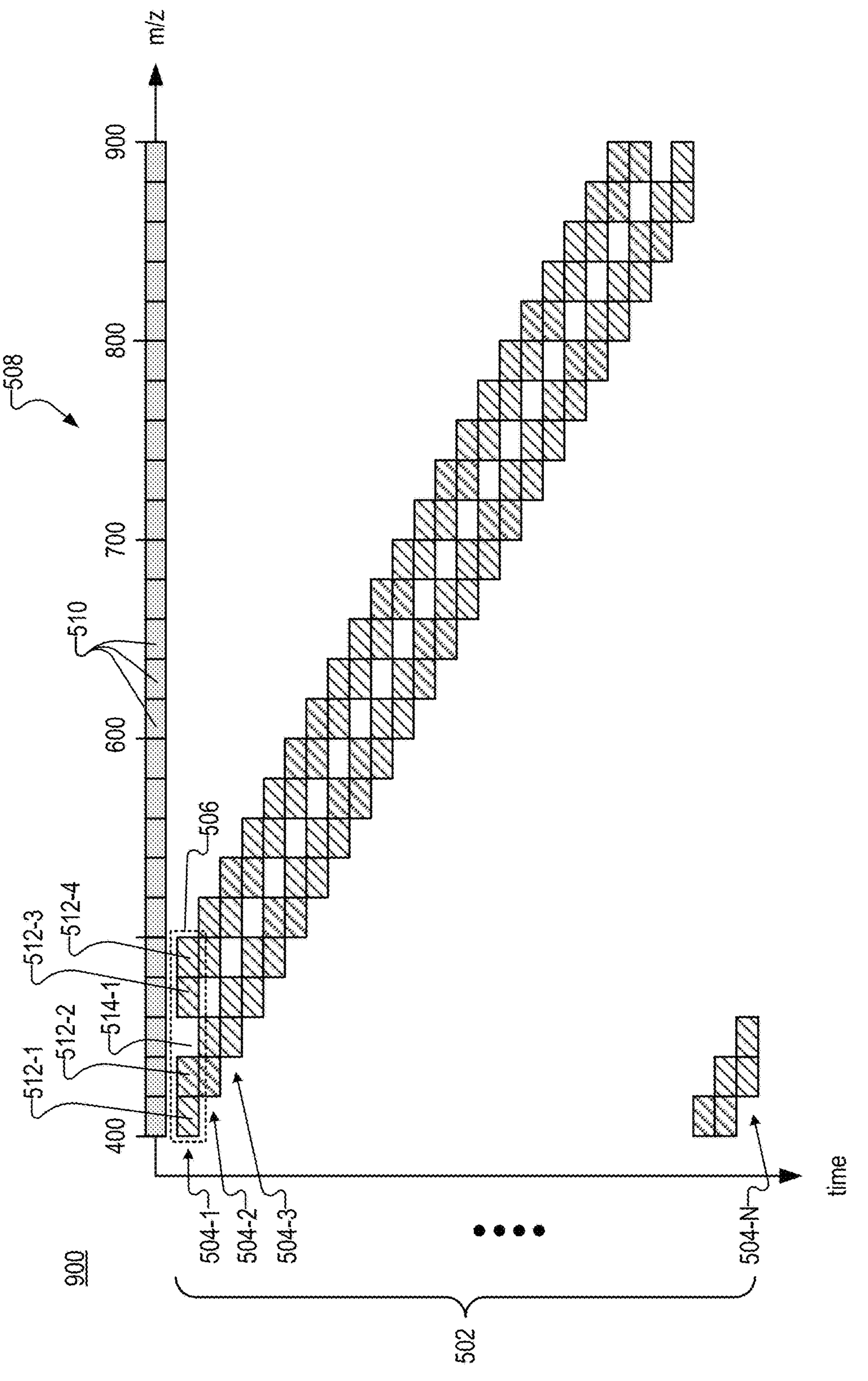

FIG. 9 shows another illustrative acquisition scheme 900. Acquisition scheme 900 is similar to acquisition scheme 500 of FIG. 5 except that, in acquisition scheme 900, parallel isolation window 506 has a different configuration than in acquisition scheme 500. In acquisition scheme 900, parallel isolation window 506 has only one m/z gap 514-1 (between isolation sub-window 512-2 and isolation sub-window 512-3), and isolation sub-window 512-3 is adjacent to and contiguous with isolation sub-window 512-4.

Figure 10:
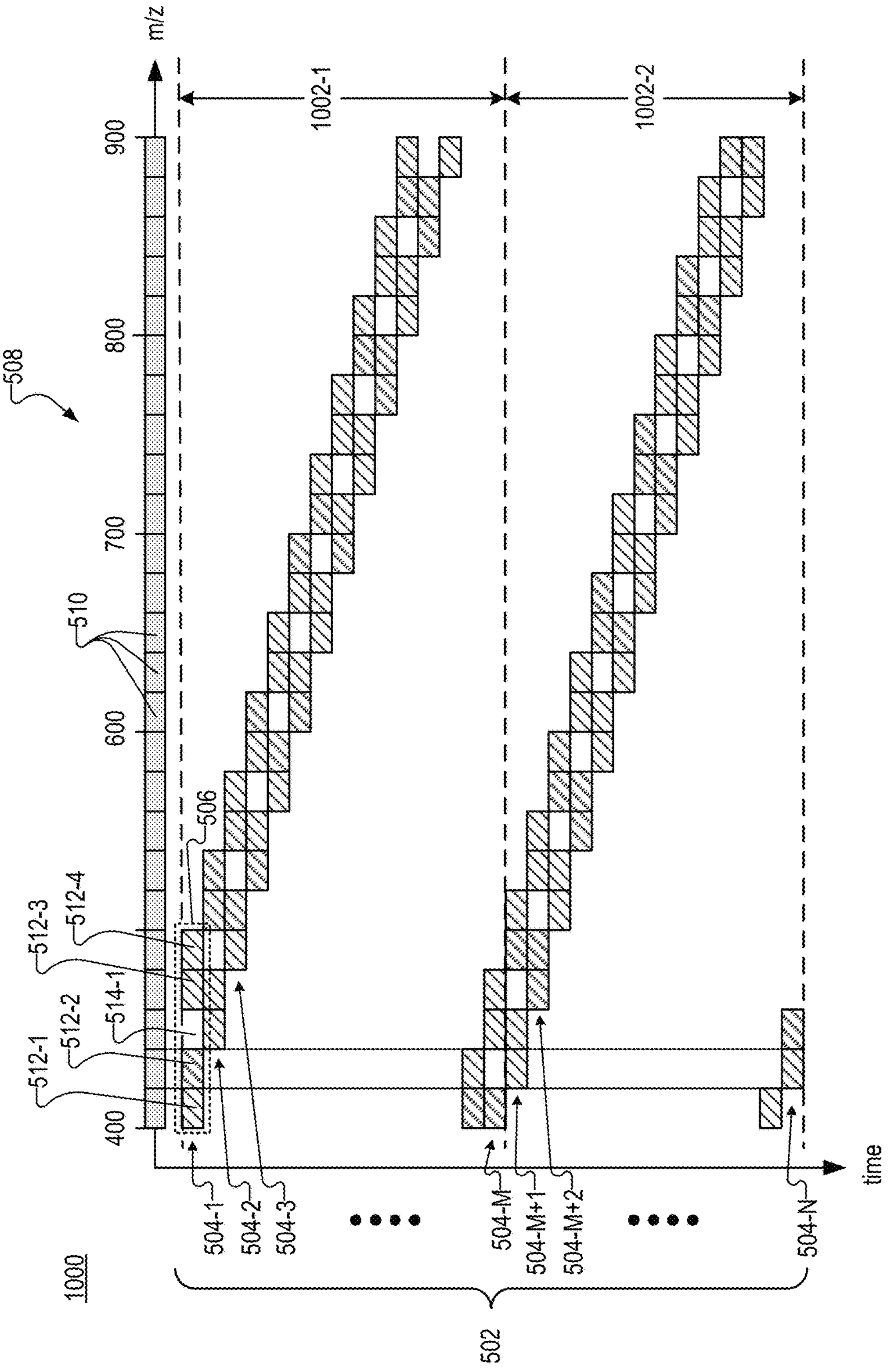

FIG. 10 shows another illustrative acquisition scheme 1000. Acquisition scheme 1000 is similar to acquisition scheme 900 of FIG. 9 except that, in acquisition scheme 1000, acquisition cycle 502 includes a first sub-cycle 1002-1 of acquisitions 504 (e.g., acquisitions 504-1, 504-2, 504-3, to 504-M) and a second sub-cycle 1002-2 of acquisitions 504 (e.g., acquisitions 504-M+1, 504-M+2, to 504-N). Second sub-cycle 1002-2 is performed after first sub-cycle 1002-1. Parallel isolation window 506 is successively positioned throughout precursor m/z range 508 such that each isolation window unit 510 of precursor m/z range 508 is analyzed at least once during first sub-cycle 1002-1. Similarly, parallel isolation window 506 is successively positioned throughout precursor m/z range 508 such that each isolation window unit 510 of precursor m/z range 508 is analyzed at least once during second sub-cycle 1002-2.

With the dual sub-cycle ordering of acquisitions 504 of acquisition scheme 1000, the entire precursor m/z range 508 is analyzed more frequently as compared with acquisition scheme 900 (e.g., at twice the sampling frequency of acquisition scheme 500). This higher-frequency sampling may be configured to achieve sampling at or above the Nyquist limit or any other desired or required frequency.

Figure 11:
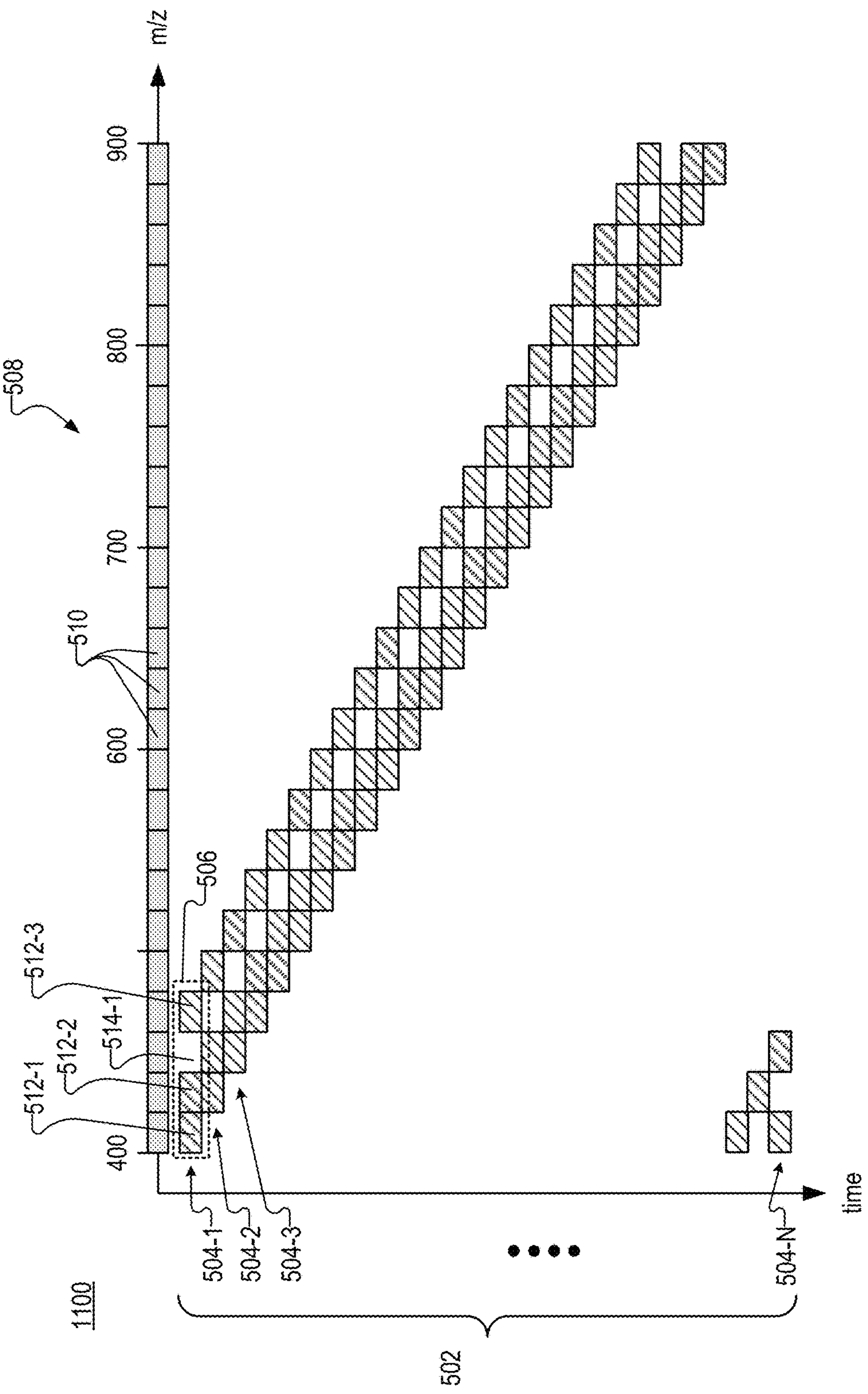

FIG. 11 shows another illustrative acquisition scheme 1100. Acquisition scheme 1100 is similar to acquisition scheme 500 except that, in acquisition scheme 1100, parallel isolation window 506 has a different configuration than in acquisition scheme 500. In acquisition scheme 1100, parallel isolation window 506 has three isolation sub-windows 512 (e.g., isolation sub-windows 512-1, 512-2, and 512-3; isolation sub-window 512-4 of acquisition scheme 500 is omitted).

Figure 12:
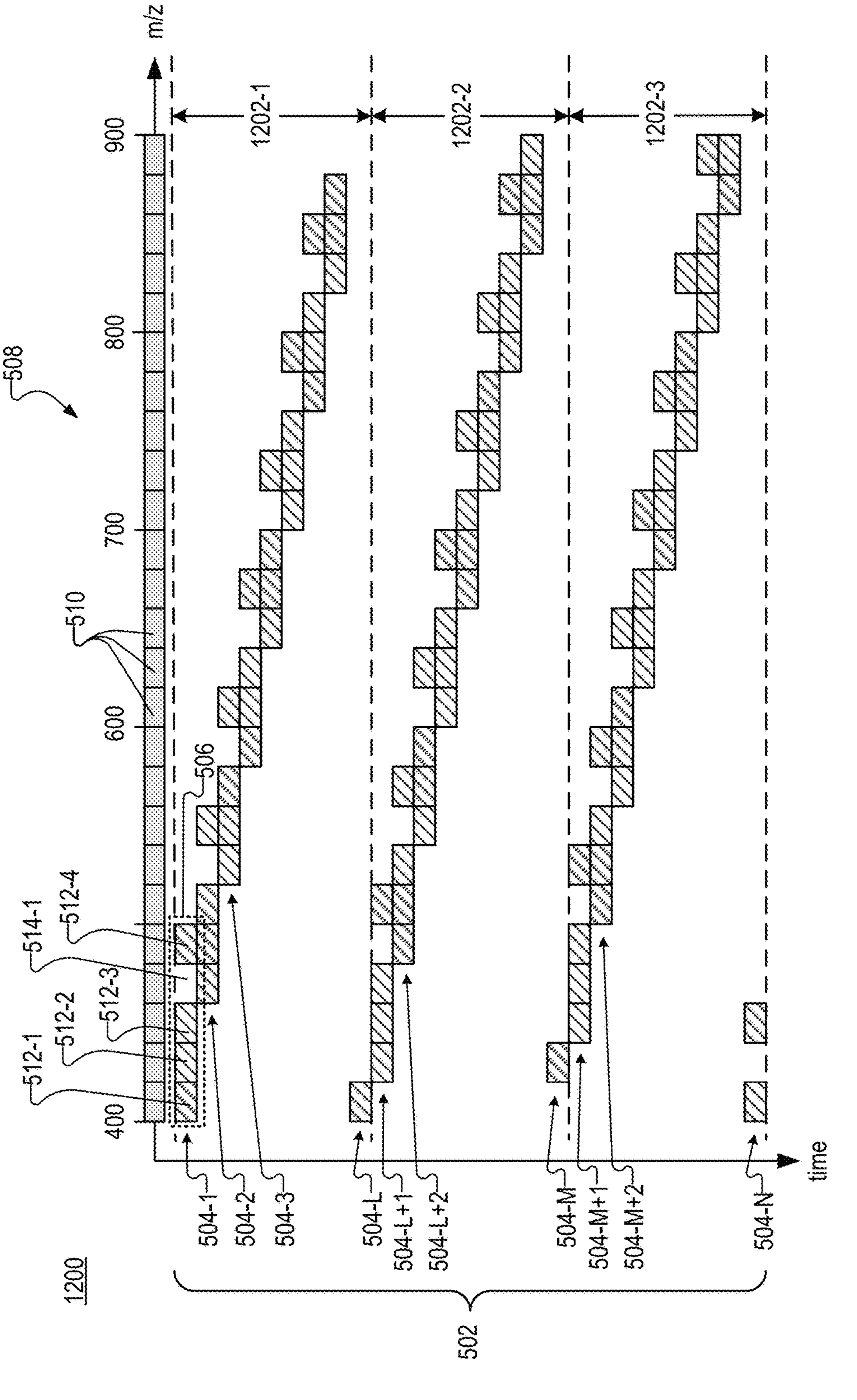

FIG. 12 shows another illustrative acquisition scheme 1200. In acquisition scheme 1200, parallel isolation window 506 has three adjacent and contiguous isolation sub-windows 512 (e.g., isolation sub-windows 512-1, 512-2, and 512-3) and an isolation sub-window 512-4 that is adjacent to but non-contiguous with isolation sub-window 512-3. An m/z gap 514-1 is located between isolation sub-window 512-3 and isolation sub-window 512-4. In acquisition scheme 1200, acquisition cycle 502 includes a first sub-cycle 1202-1 including a first sub-set of acquisitions 504 (e.g., acquisitions 504-1, 504-2, 504-3, to 504-L), a second sub-cycle 1202-2 including a second sub-set of acquisitions 504 (e.g., acquisitions 504-L+1, 504-L+2, to 504-M), and a third sub-cycle 1202-3 including a third sub-set of acquisitions 504 (e.g., acquisitions 504-M+1, 504-M+2, to 504-N).

Second sub-cycle 1202-2 is performed after first sub-cycle 1202-1, and third sub-cycle 1202-3 is performed after second sub-cycle 1202-2. Parallel isolation window 506 is successively positioned throughout precursor m/z range 508 such that each isolation window unit 510 of precursor m/z range 508 is analyzed at least once during first sub-cycle 1202-1. Similarly, parallel isolation window 506 is successively positioned throughout precursor m/z range 508 such that each isolation window unit 510 of precursor m/z range 508 is analyzed at least once during second sub-cycle 1202-2. Similarly, parallel isolation window 506 is successively positioned throughout precursor m/z range 508 such that each isolation window unit 510 of precursor m/z range 508 is analyzed at least once during third sub-cycle 1202-3.

With the triple sub-cycle ordering of acquisitions 504 of acquisition scheme 1200, the entire precursor m/z range 508 is analyzed more frequently as compared with acquisition scheme 500 (e.g., at three times the sampling frequency of acquisition scheme 500), acquisition scheme 900, and acquisition scheme 1100, even though the total acquisition cycle times are the same.

Various modifications may be made to the examples and embodiments described herein. In some examples, the unit width of isolation window units 510, the isolation width of parallel isolation window 506, and/or the total m/z span of parallel isolation window 506 is not fixed within acquisition cycle 502 but varies based on m/z. For example, the unit width of isolation window units 510 may be larger (or smaller) at edge regions of precursor m/z range 508 (e.g., from 400-500 m/z and 800-900 m/z) than at a center region of precursor m/z range 508 (e.g., from 500 m/z to 800 m/z). In additional or alternative examples, the configuration of parallel isolation window 506 may vary throughout an acquisition cycle so long as each isolation window unit 510 of the precursor m/z range 508 is analyzed at least twice.

In yet further examples, the acquisition scheme used to implement method 400 during a DIA experiment can vary along with the elution gradient. For example, different acquisition schemes may be used at different times during the elution gradient. For instance, acquisition scheme 500 may be used during a first period of time during elution of the components from liquid chromatograph 102 and acquisition scheme 900 or acquisition scheme 1100 may be used at a second period time during the elution of the components from liquid chromatograph 102.

As shown in the examples of FIGS. 5, 6A to 6D, and 7A to 7C, parallel isolation window 506 is successively positioned within precursor m/z range 508 sequentially in order of increasing m/z within acquisition cycle 502 or within acquisition sub-cycles 802, 1002, and 1202. However, any other ordering of parallel isolation window 506 within acquisition cycle 502 and/or within sub-cycles 802, 1002, and 1202 may be used, including sequential in order of decreasing m/z, non-sequential along the m/z domain (e.g., staggered, alternating, or some other pattern), or random.

In the acquisition schemes described above, parallel isolation window 506 has a "square" profile defined only by zeroes and ones, where ones indicate isolation sub-windows 512 for isolation of precursor ions and zeroes indicate m/z gaps. However, parallel isolation window 506 may have any other suitable profile. In some examples, parallel isolation window 506 is formed by a parallel isolation waveform, such as a square waveform, that steps down from one to zero at the minimum and maximum ends of parallel isolation window 506 and at edges next to m/z gaps. For example, edges of parallel isolation window 506 may have values between zero and one (e.g., 0.80, 0.65, 0.50, 0.35, etc.). In other examples, parallel isolation window 506 has a gradual, continuous transition between zero and one at the edges. For instance, parallel isolation window 506 may have a non-square profile that varies smoothly between zero to one at the edges, such as a sinusoidal waveform. These modified profiles of parallel isolation window 506 may facilitate demultiplexing better than square profiles with only zeroes and ones.

The systems and methods described herein may be applied to other types of instruments, where the concept of parallel isolation is extended to include any set of ion isolations that can be performed without a loss in duty cycle. For example, an instrument with an upstream ion accumulator (e.g., a collision cell or an ion storage device) and a downstream ion separator (e.g., a quadrupole mass filter, an ion trap, etc.) could be controlled such that, while ions are accumulated in the accumulator, a set of one or more ion separations takes place serially in the downstream ion separator to produce a population of precursor ions. Serial isolation could be performed, for example, using mass-selective ejection of ions, as described above. The isolated precursor ions are then fragmented, and the total population of ion fragments are analyzed in a single MS/MS acquisition. Such instruments would enjoy the benefits of DIA acquisition with parallel isolation multiplexing but without the need for parallel isolation techniques, such as waveform isolation.

The concept of parallel isolation can also be extended to ion mobility-mass spectrometry (IM-MS) instruments. For example, distinct packets of ions may be released serially from an ion mobility separator by using a parallel mobility window that is successively positioned within an ion mobility range during an acquisition. The parallel mobility window may be configured similar to the parallel isolation windows described herein. For example, the parallel mobility window may include, for each release of ions, a distinct set of ion mobility sub-windows, wherein at least two adjacent ion mobility sub-windows are non-contiguous along the ion mobility domain. Each distinct packet of ions released from the ion mobility separator is transferred to a fragmentor (e.g., a collision cell) for generation of product ions. The product ions from all of the ion packets for the acquisition may be accumulated in an accumulator, and all of the accumulated ions may then be mass analyzed in a mass analyzer in a single mass spectrum (e.g., a single MS/MS spectrum).

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
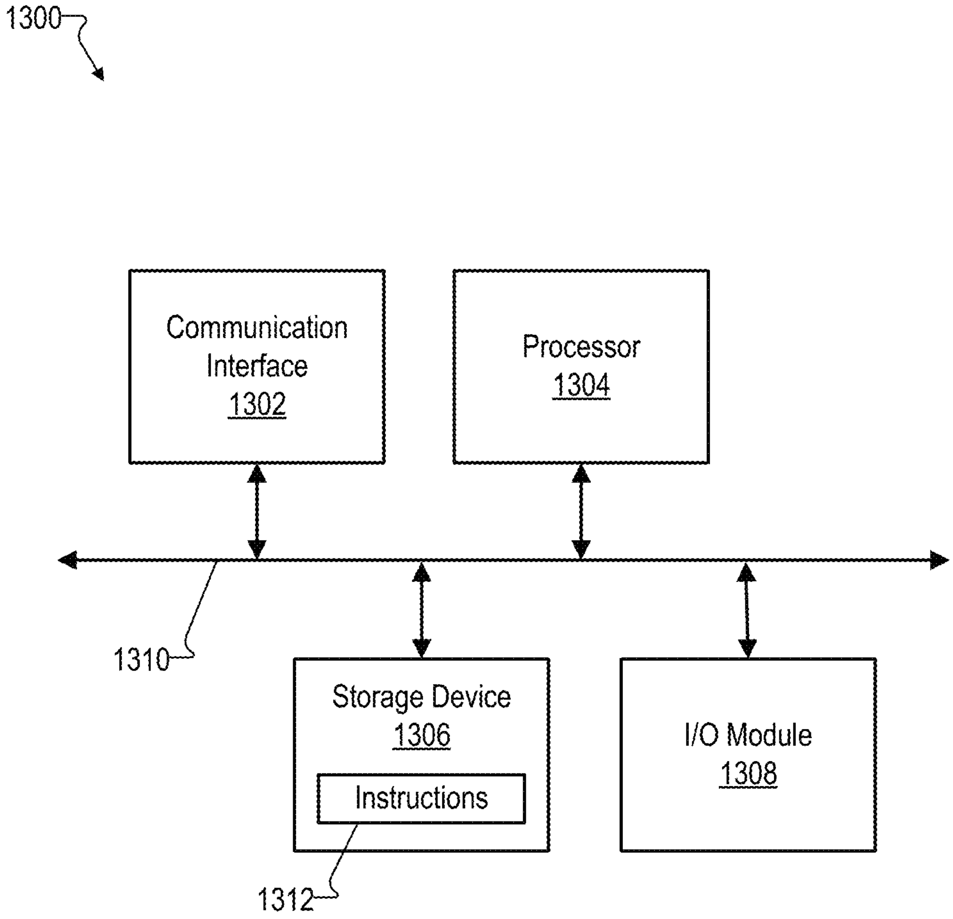
FIG. 13 shows an illustrative computing device that may be specifically configured to perform one or more of the processes described herein.

FIG. 13 shows an illustrative computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected one to another via a communication infrastructure 1310. While an illustrative computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data and/or interpreting, executing, and/or directing execution of one or more of the instructions, processes, and/or operations described herein. Processor 1304 may perform operations by executing computer-executable instructions 1312 (e.g., an application, software, code, and/or other executable data instance) stored in storage device 1306.

Storage device 1306 may include one or more data storage media, devices, or configurations and may employ any type, form, and combination of data storage media and/or device. For example, storage device 1306 may include, but is not limited to, any combination of the non-volatile media and/or volatile media described herein. Electronic data, including data described herein, may be temporarily and/or permanently stored in storage device 1306. For example, data representative of computer-executable instructions 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. One or more I/O modules may be used to receive input for a single virtual experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1300. For example, memory 302 may be implemented by storage device 1306, and processor 304 may be implemented by processor 1304.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

one or more processors; and memory storing executable instructions that, when executed by the one or more processors, cause a computing device to perform a process comprising:

controlling a mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range;

wherein:

the precursor m/z range is divided into a plurality of isolation window units;

the parallel isolation window comprises, for each acquisition of the acquisition cycle, a set of isolation sub-windows corresponding to a distinct set of isolation window units of the precursor m/z range;

at least two adjacent isolation sub-windows of the parallel isolation window are non-contiguous; and each isolation window unit of the precursor m/z range is analyzed at least twice during the acquisition cycle.

2. The system of claim 1, wherein the process further comprises:

generating, based on the set of mass spectra acquired during the acquisition cycle, a mass spectrum for the precursor m/z range.

3. The system of claim 2, wherein generating the mass spectrum comprises demultiplexing the set of mass spectra to assign a signal representative of a product ion to an appropriate isolation window unit of the precursor m/z range.

4. The system of claim 2, wherein a measure of selectivity of the mass spectrum is less than an m/z range of the parallel isolation window.

5. The system of claim 1, wherein:

the acquisition cycle comprises a first sub-cycle comprising a first sub-set of acquisitions and a second sub-cycle comprising a second sub-set of acquisitions, wherein the second sub-cycle is performed after the first sub-cycle;

each isolation window unit of the precursor m/z range is analyzed at least once during the first sub-cycle; and each isolation window unit of the precursor m/z range is analyzed at least once during the second sub-cycle.

6. The system of claim 1, wherein acquiring the set of mass spectra comprises, for each acquisition of the acquisition cycle:

isolating a population of the precursor ions having an m/z within an m/z range of the parallel isolation window;

fragmenting the population of precursor ions to produce a population of the product ions; and mass analyzing the population of the product ions.

7. The system of claim 6, wherein the isolating, the fragmenting, and the mass analyzing are performed in an ion trap.

8. The system of claim 6, wherein:

the isolating is performed in a mass filter;

the fragmenting is performed in a collision cell positioned downstream of the mass filter; and the mass analyzing is performed in a mass analyzer positioned downstream of the collision cell.

9. The system of claim 6, wherein the isolating is performed using parallel waveform isolation.

10. The system of claim 6, wherein the isolating is performed using mass-selective ejection of ions.

11. The system of claim 6, wherein acquiring the set of mass spectra further comprises, for each acquisition of the acquisition cycle:

isolating, prior to the isolating the population of the precursor ions, a population of pre-isolated ions having an m/z within a total m/z span of the parallel isolation window;

wherein the population of the precursor ions is derived from the population of the pre-isolated ions.

12. The system of claim 11, wherein:

the isolating the population of pre-isolated ions is performed in a mass filter; and the isolating the population of the precursor ions is performed in an ion trap positioned downstream of the mass filter.

13. The system of claim 12, wherein the fragmenting is performed in the ion trap or in a collision cell positioned between the mass filter and the ion trap.

14. The system of claim 1, wherein the parallel isolation window has a waveform that varies between zero and one at edges of the parallel isolation window.

15. A system comprising:

a mass spectrometer; and a controller configured to control the mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range;

wherein:

the precursor m/z range is divided into a plurality of isolation window units;

the parallel isolation window comprises, for each acquisition of the acquisition cycle, a set of isolation sub-windows corresponding to a distinct set of isolation window units of the precursor m/z range;

at least two adjacent isolation sub-windows of the parallel isolation window are non-contiguous; and each isolation window unit of the precursor m/z range is analyzed at least twice during the acquisition cycle.

16. The system of claim 15, wherein acquiring the set of mass spectra comprises, for each acquisition of the acquisition cycle:

isolating a population of the precursor ions having an m/z within an m/z range of the parallel isolation window;

fragmenting the population of the precursor ions to produce a population of the product ions; and mass analyzing the population of the product ions.

17. The system of claim 16, wherein:

the mass spectrometer comprises an ion trap; and the isolating and the mass analyzing are performed in the ion trap.

18. The system of claim 16, wherein:

the mass spectrometer comprises a mass filter, a collision cell positioned downstream of the mass filter, and a mass analyzer positioned downstream of the collision cell;

the isolating is performed in the mass filter;

the fragmenting is performed in the collision cell; and the mass analyzing is performed in the mass analyzer.

19. The system of claim 16, wherein the acquiring the set of mass spectra further comprises, for each acquisition of the acquisition cycle:

isolating, prior to the isolating the population of the precursor ions, a population of pre-isolated ions having an m/z within a total m/z span of the parallel isolation window;

wherein the population of the precursor ions is derived from the population of the pre-isolated ions.

20. The system of claim 19, wherein:

the mass spectrometer comprises a mass filter and an ion trap positioned downstream of the mass filter;

the isolating the population of pre-isolated ions is performed in the mass filter; and the isolating the population of the precursor ions is performed in the ion trap.

21. The system of claim 20, wherein:

the mass spectrometer further comprises a collision cell positioned downstream of the mass filter and upstream of the ion trap; and the fragmenting is performed in the ion trap.

22. The system of claim 21, wherein a first population of ions is processed in the ion trap during a first acquisition while a second population of ions is processed in the mass filter and the collision cell during a second acquisition.

23. The system of claim 15, wherein the controller is further configured to generate, based on the set of mass spectra, a mass spectrum for the precursor m/z range.

24. A non-transitory computer-readable medium storing instructions that, when executed, direct at least one processor of a computing device for mass spectrometry to perform a process comprising:

controlling a mass spectrometer to acquire, during a plurality of acquisitions constituting an acquisition cycle, a set of mass spectra of product ions derived from precursor ions isolated based on a parallel isolation window successively positioned throughout a precursor mass-to-charge ratio (m/z) range;

wherein:

the precursor m/z range is divided into a plurality of isolation window units;

the parallel isolation window comprises, for each acquisition of the acquisition cycle, a set of isolation sub-windows corresponding to a distinct set of isolation window units of the precursor m/z range;

at least two adjacent isolation sub-windows of the parallel isolation window are non-contiguous; and each isolation window unit of the precursor m/z range is analyzed at least twice during the acquisition cycle.

25. The computer-readable medium of claim 24, wherein the process further comprises:

generating, based on the set of mass spectra acquired during the acquisition cycle, a mass spectrum for the precursor m/z range.

26. The computer-readable medium of claim 25, wherein the generating the mass spectrum comprises demultiplexing the set of mass spectra to assign a signal representative of a product ion to an appropriate isolation window unit of the precursor m/z range.

27. The computer-readable medium of claim 24, wherein:

the acquisition cycle comprises a first sub-cycle comprising a first sub-set of acquisitions and a second sub-cycle comprising a second sub-set of acquisitions, wherein the second sub-cycle is performed after the first sub-cycle;

each isolation window unit of the precursor m/z range is analyzed at least once during the first sub-cycle; and each isolation window unit of the precursor m/z range is analyzed at least once during the second sub-cycle.

28. The computer-readable medium of claim 24, wherein acquiring the set of mass spectra comprises, for each acquisition of the acquisition cycle:

isolating a population of the precursor ions having an m/z within an m/z range of the parallel isolation window;

fragmenting the population of precursor ions to produce a population of the product ions; and mass analyzing the population of the product ions.

29. The computer-readable medium of claim 28, wherein acquiring the set of mass spectra further comprises, for each acquisition of the acquisition cycle:

isolating, prior to the isolating the population of the precursor ions, a population of pre-isolated ions having an m/z within a total m/z span of the parallel isolation window;

wherein the population of the precursor ions is derived from the population of the pre-isolated ions.

* * * * *